March 31, 1931. E. S. HALL 1,798,531
MACHINE FOR MAKING PLASTER BASES OR SUPPORTS
Filed Feb. 11, 1923 25 Sheets-Sheet 1
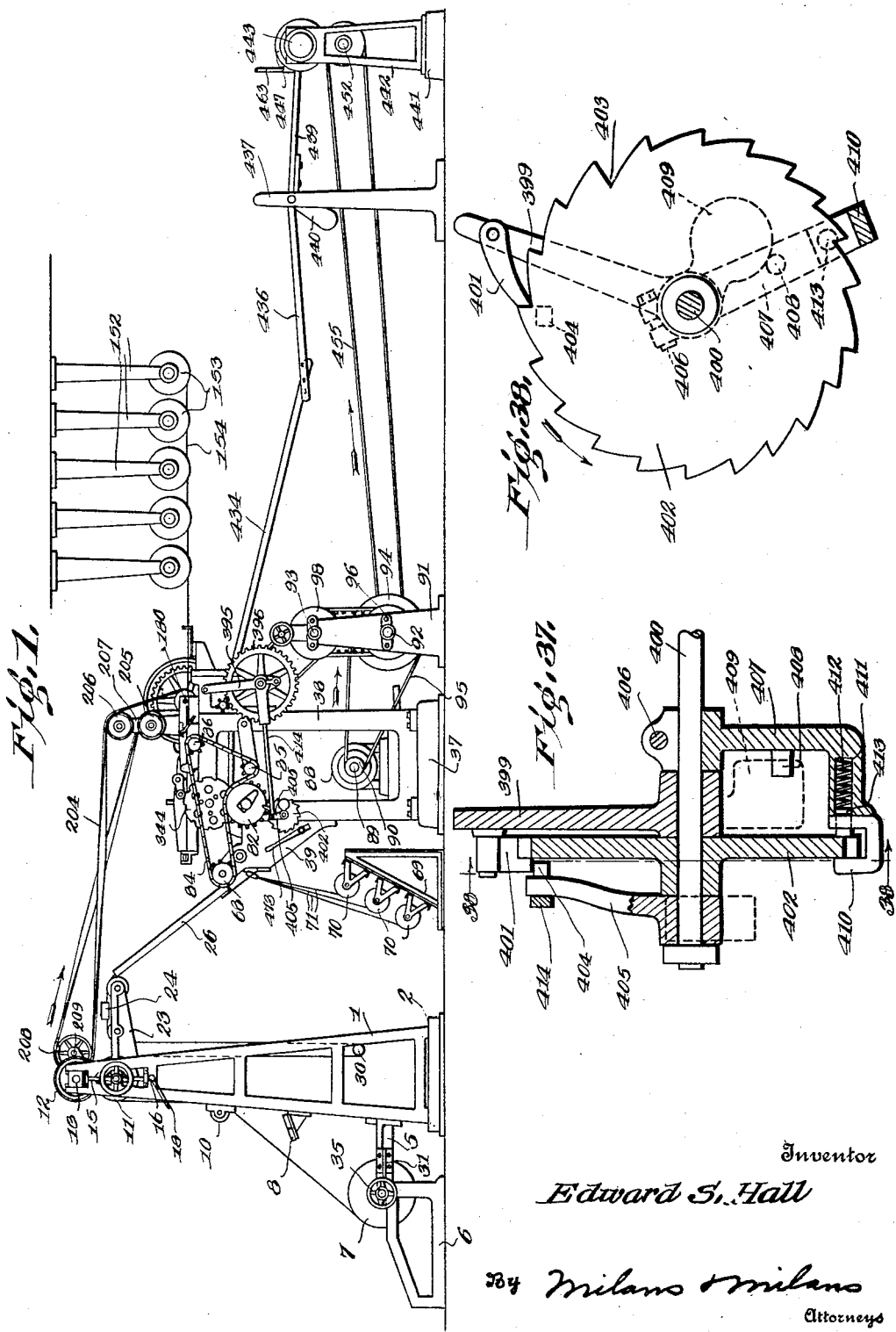
Inventor
Edward S. Hall
By Milans & Milans
Attorneys

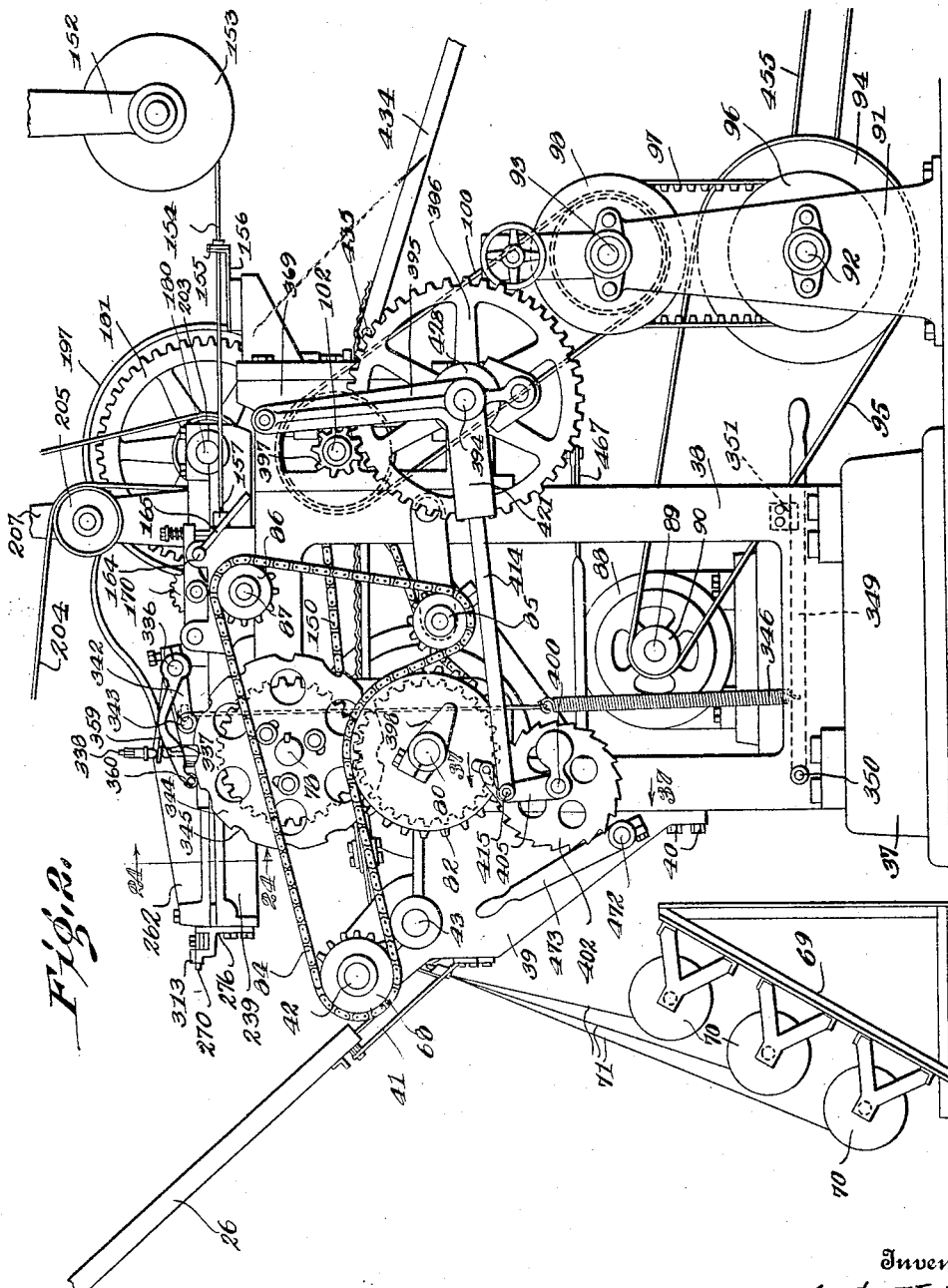

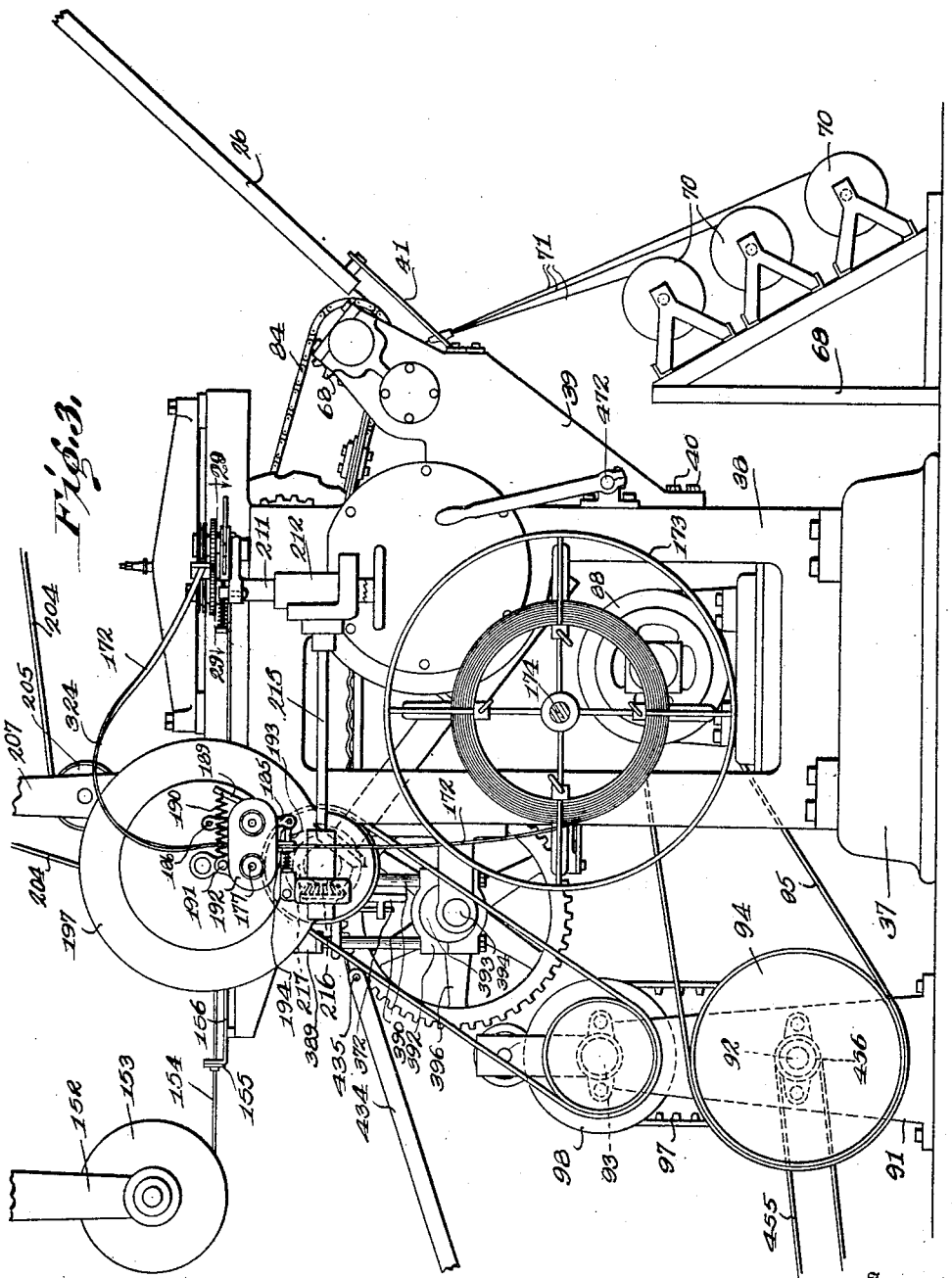

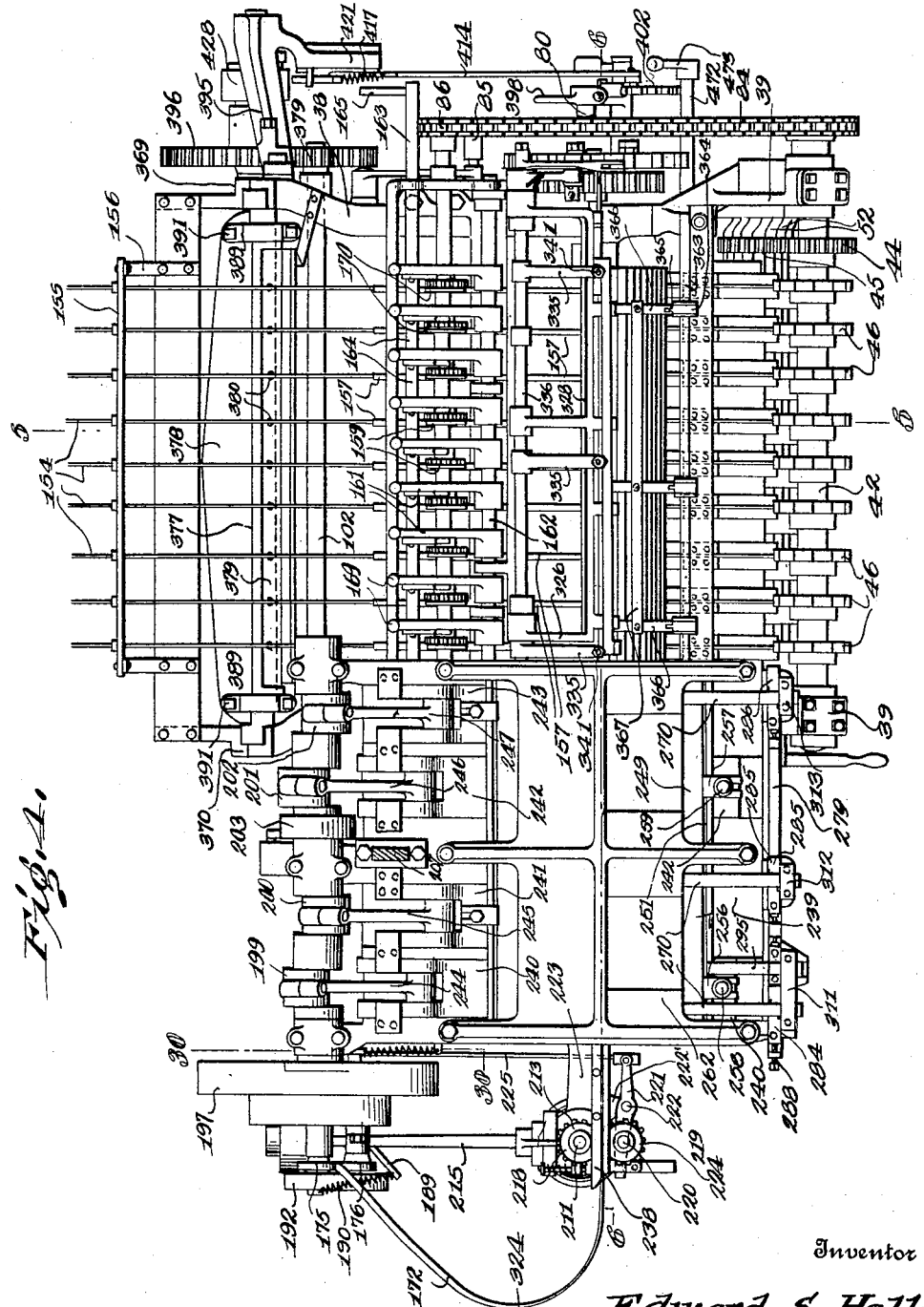

March 31, 1931. E. S. HALL 1,798,531
MACHINE FOR MAKING PLASTER BASES OR SUPPORTS
Filed Feb. 11, 1928  25 Sheets-Sheet 5
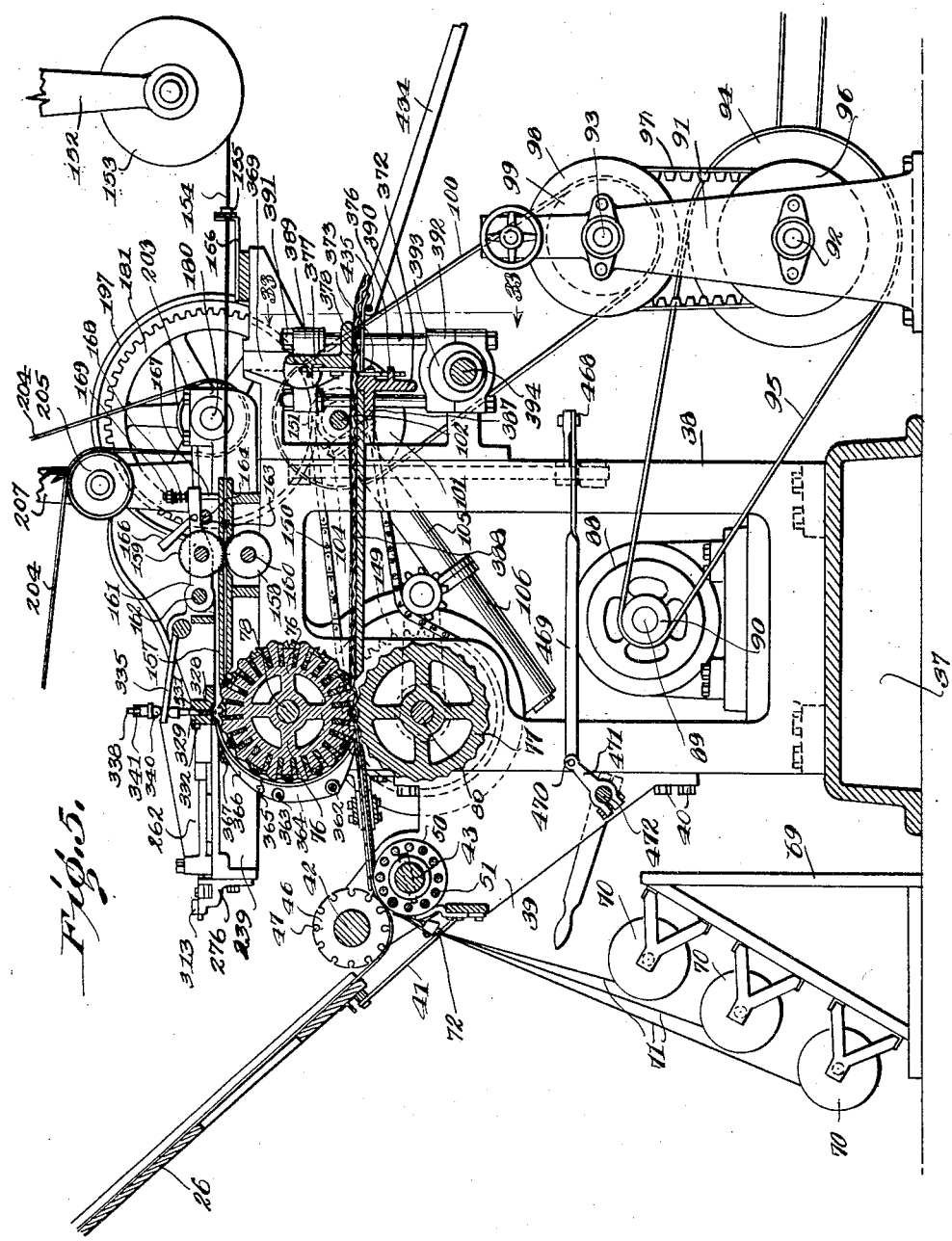
Inventor
Edward S. Hall
By Milans & Milans
Attorneys

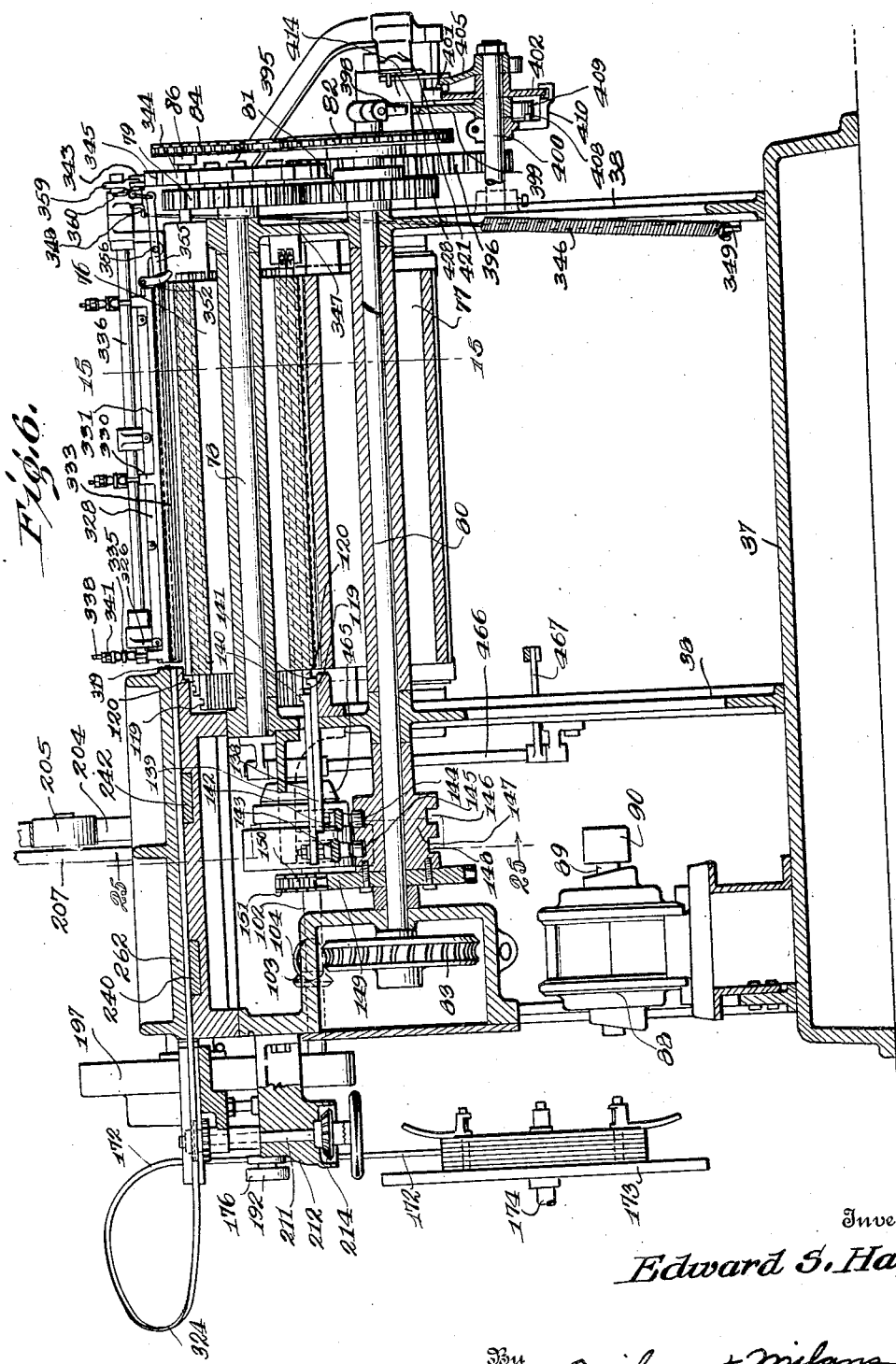

March 31, 1931. E. S. HALL 1,798,531
MACHINE FOR MAKING PLASTER BASES OR SUPPORTS
Filed Feb. 11, 1928    25 Sheets-Sheet 7
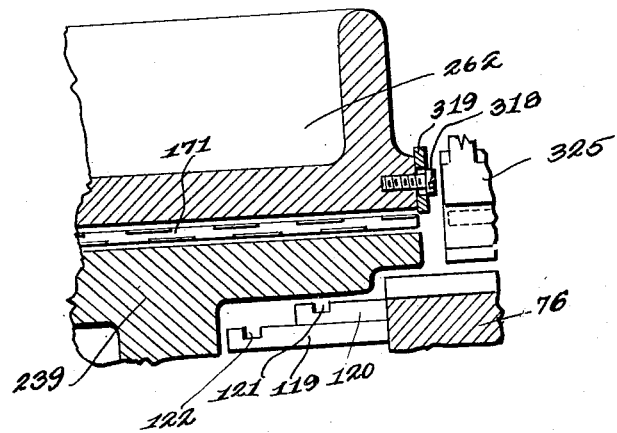
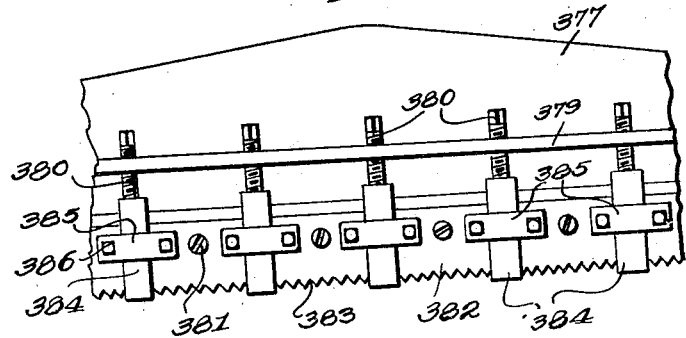
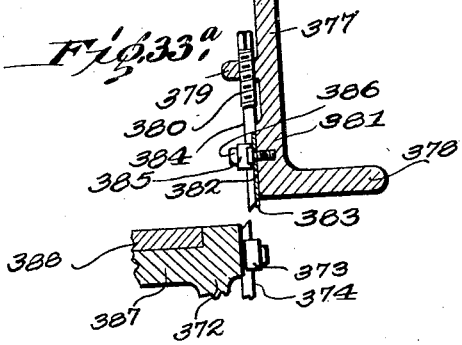
Inventor
Edward S. Hall
By Milans & Milans
Attorneys

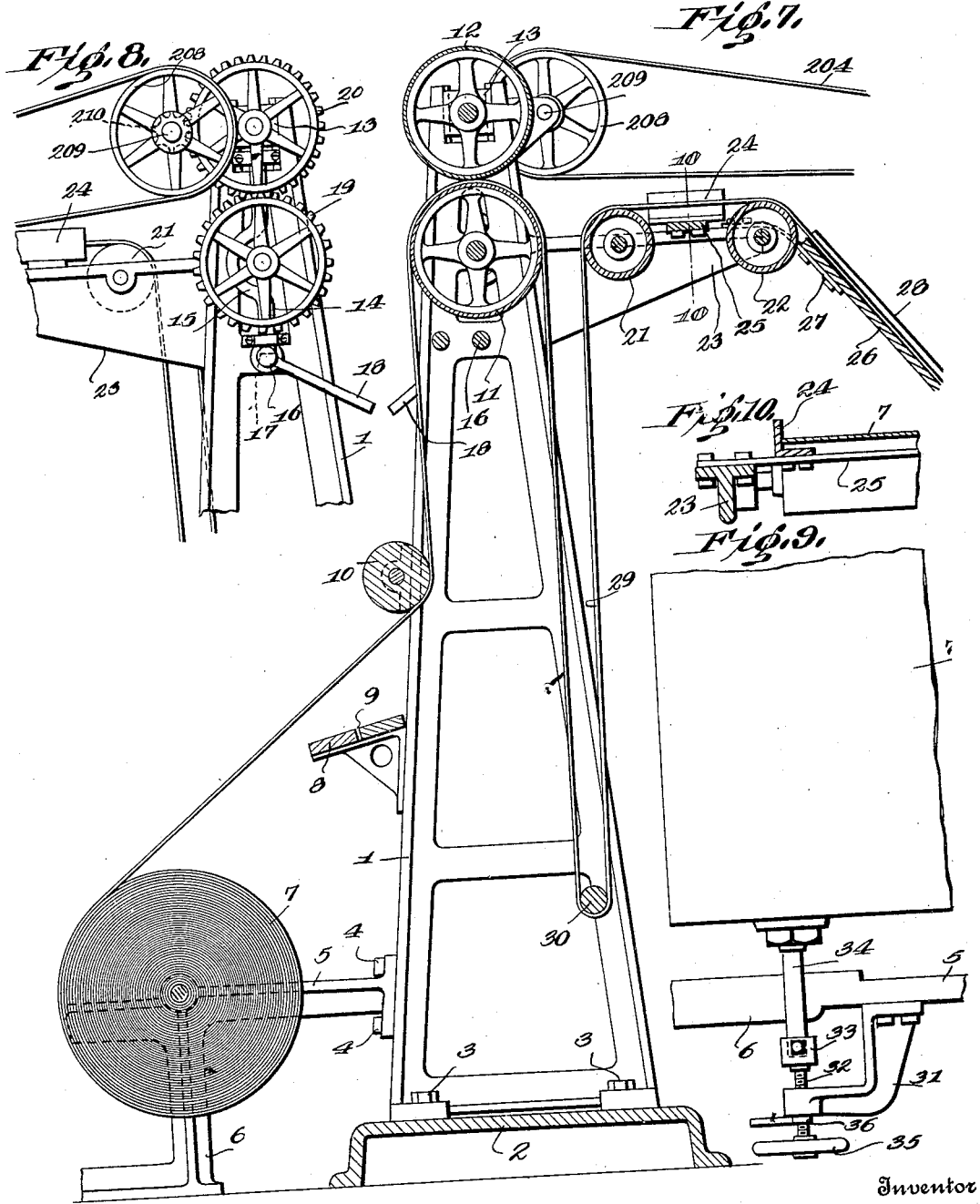

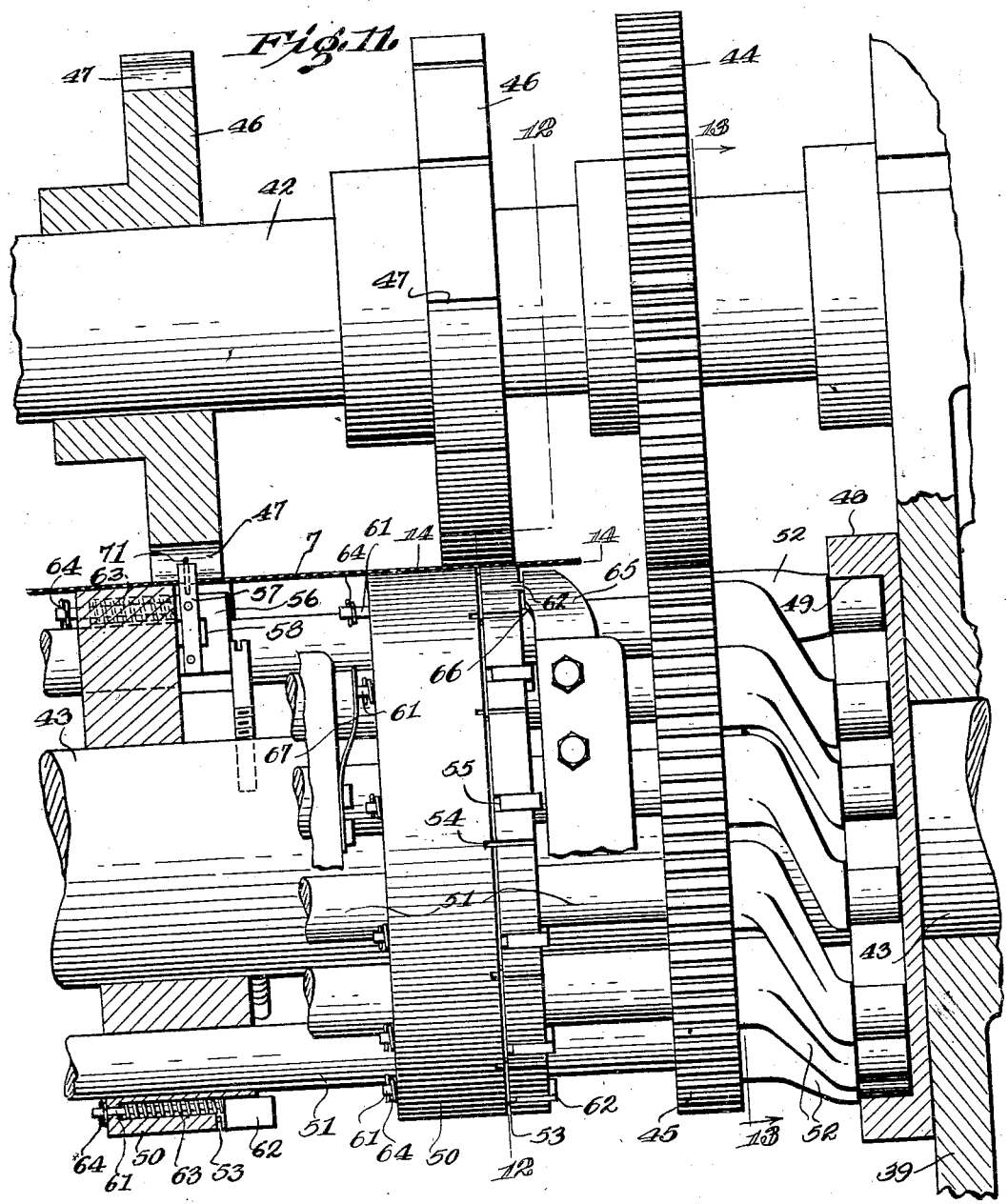

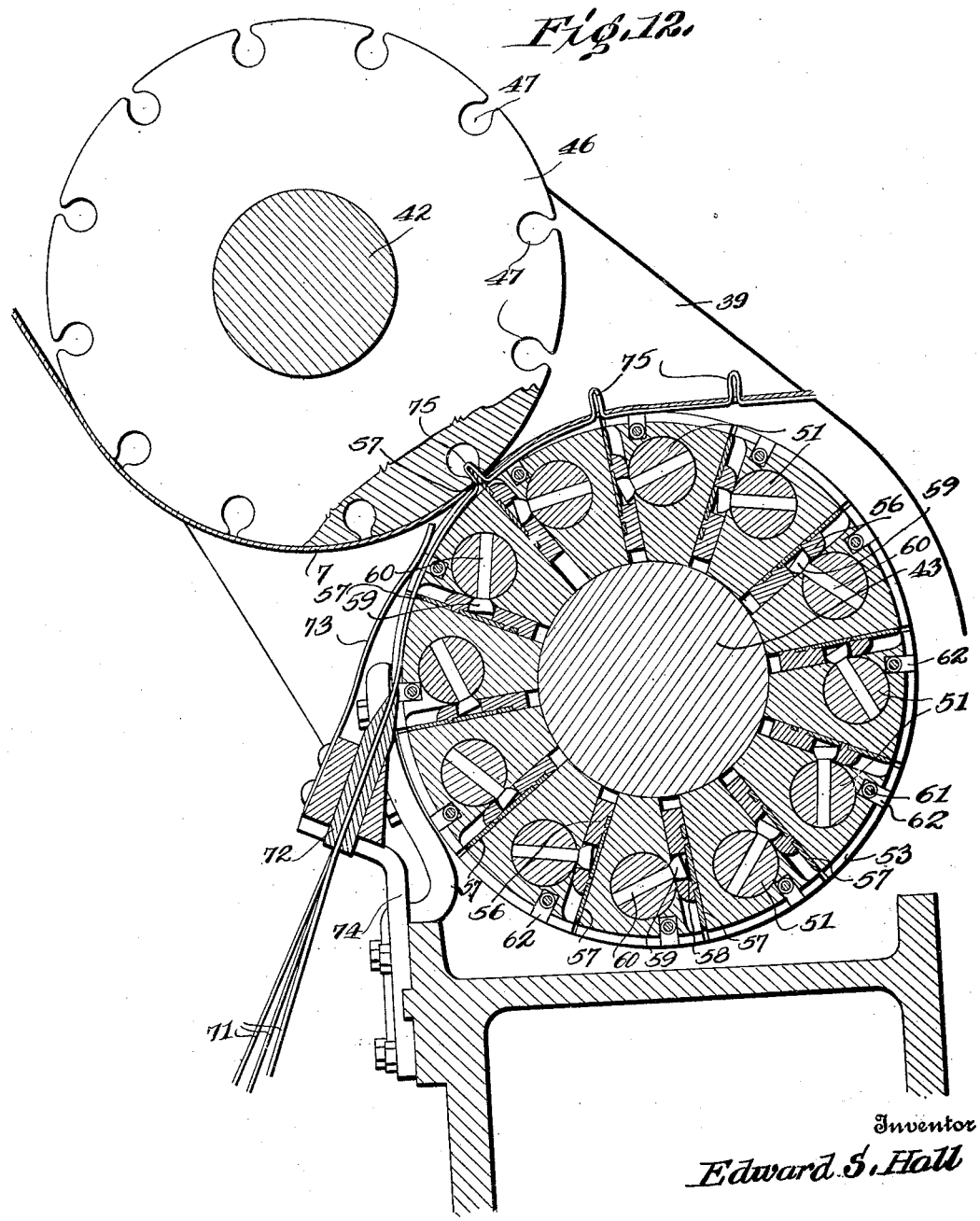

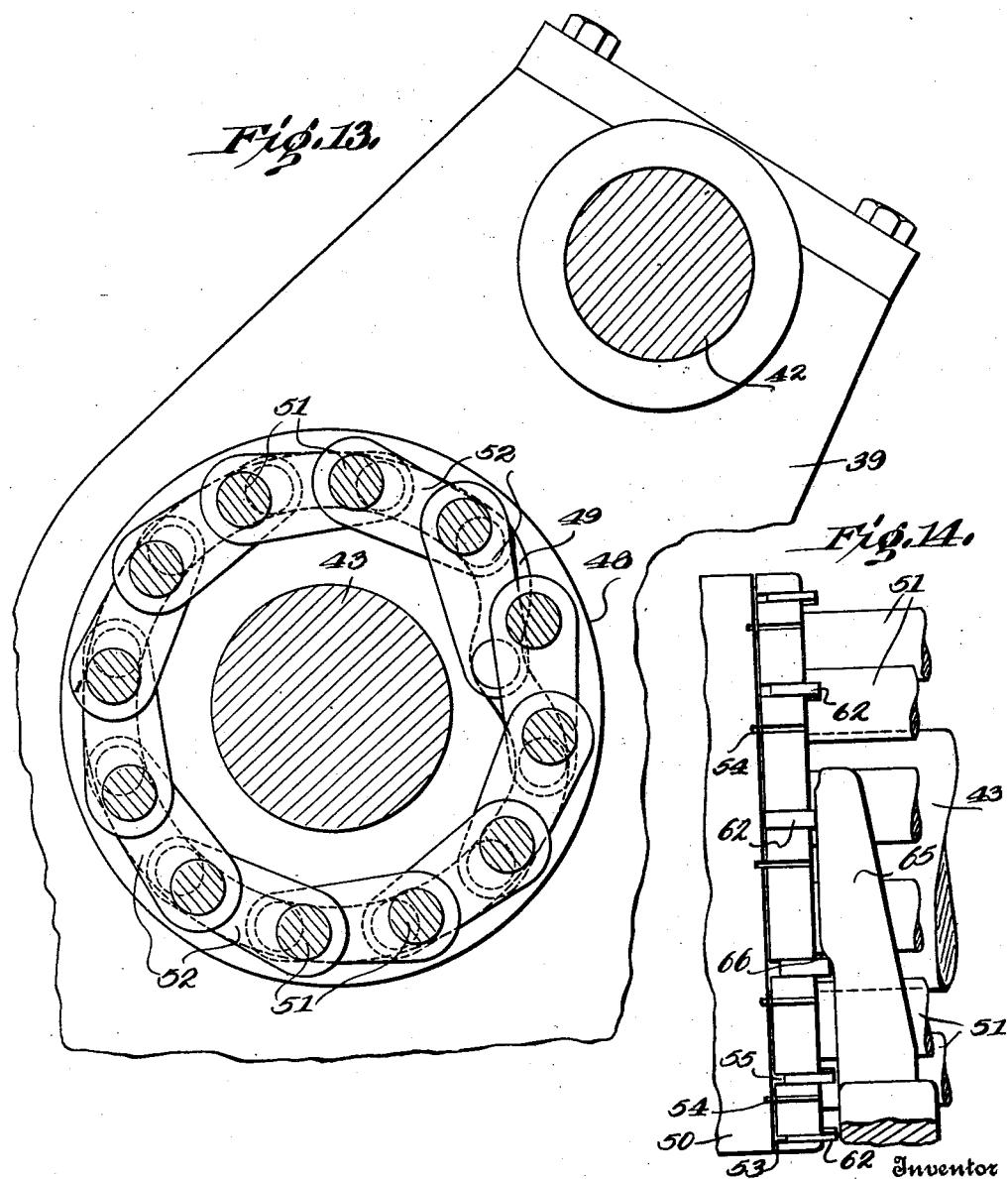

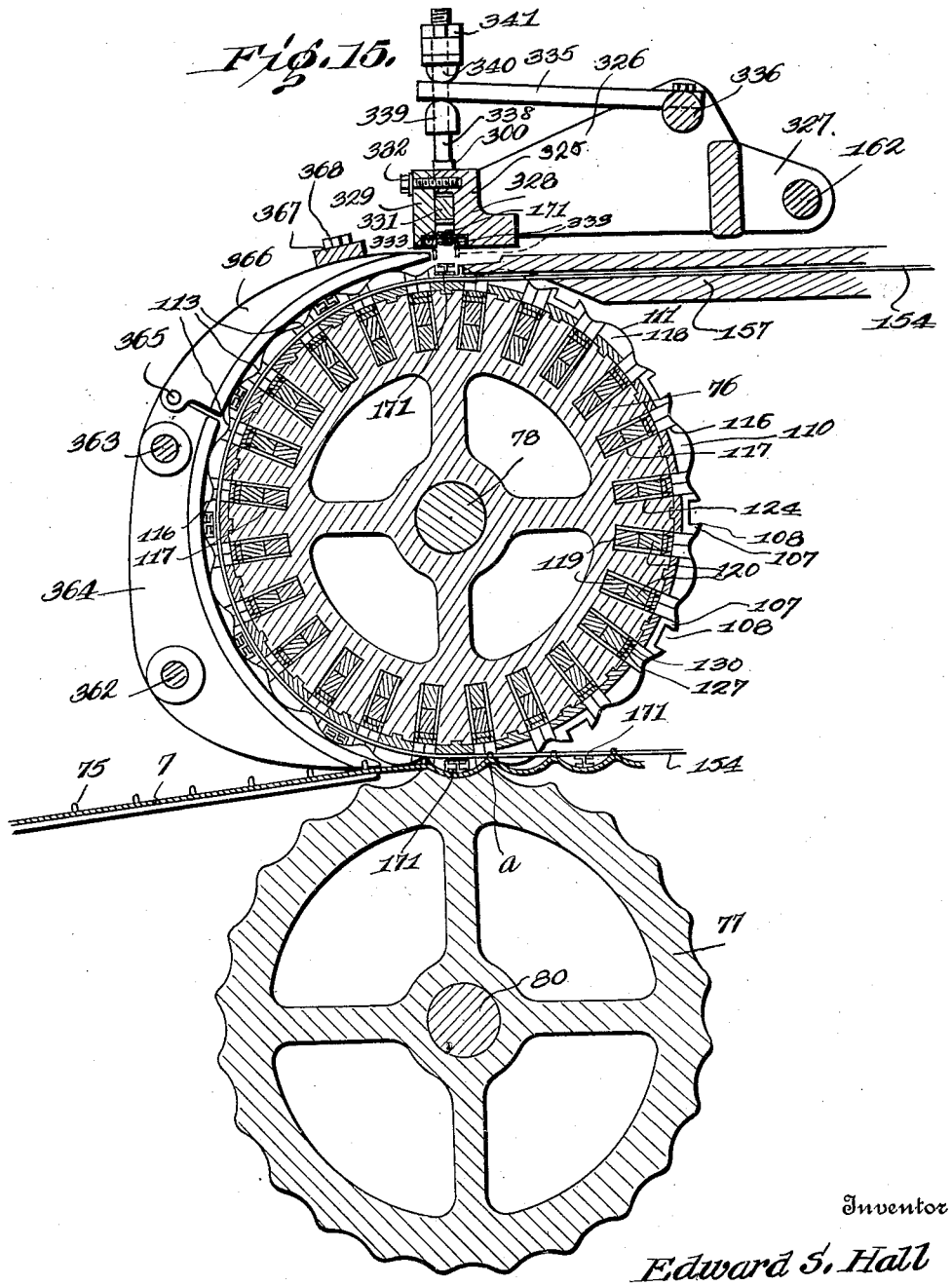

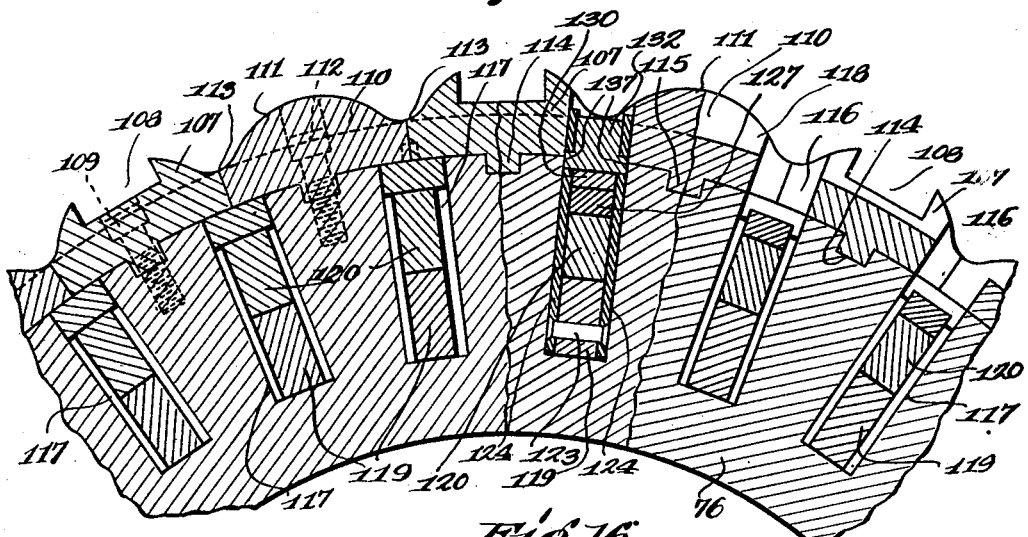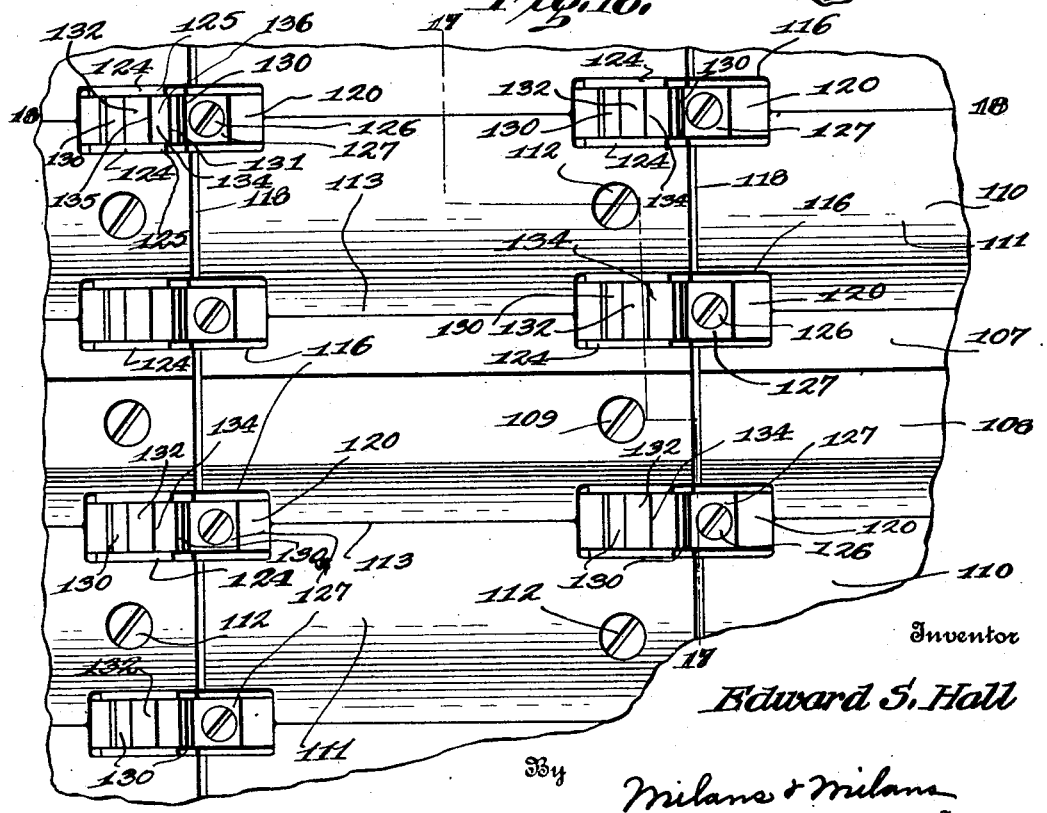

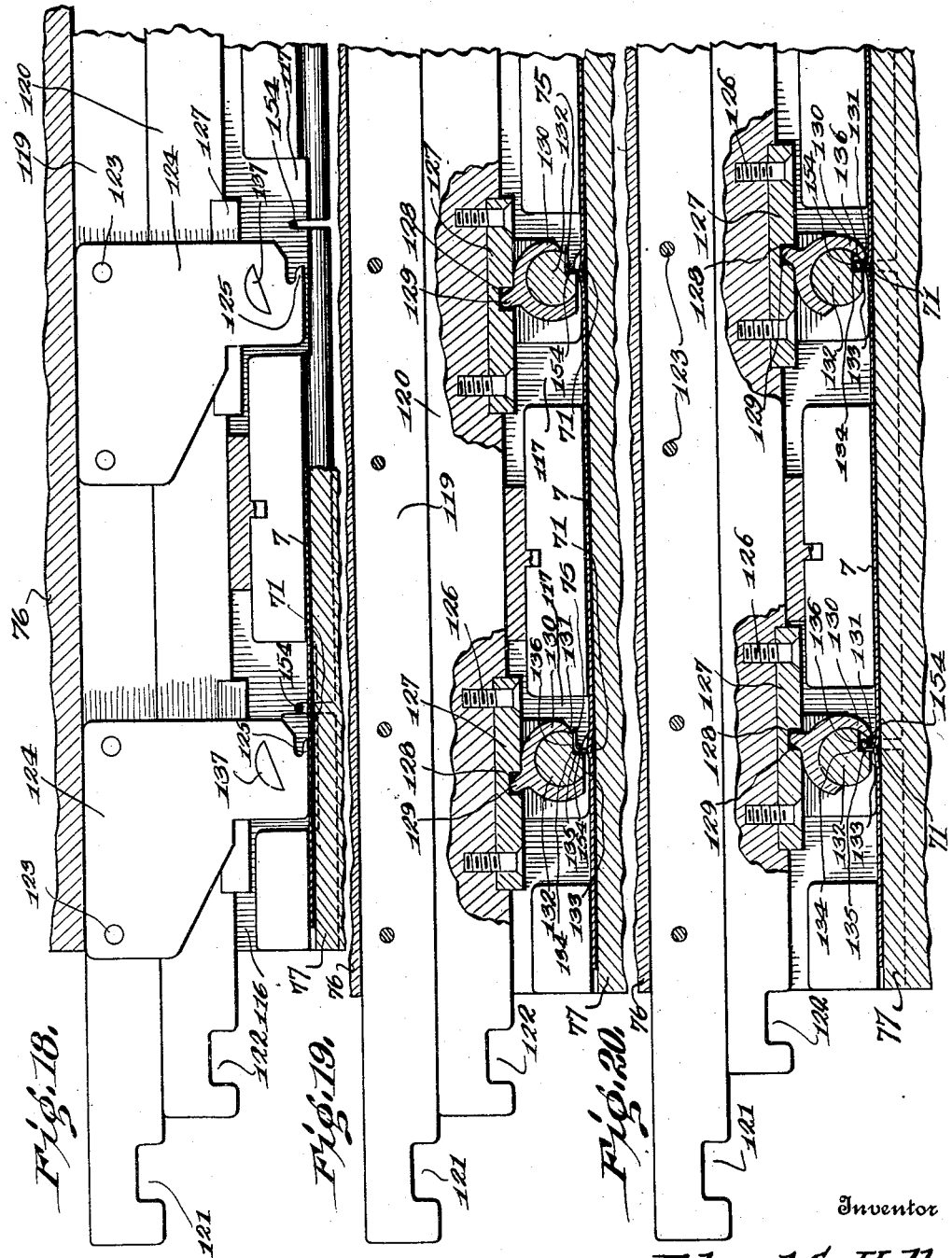

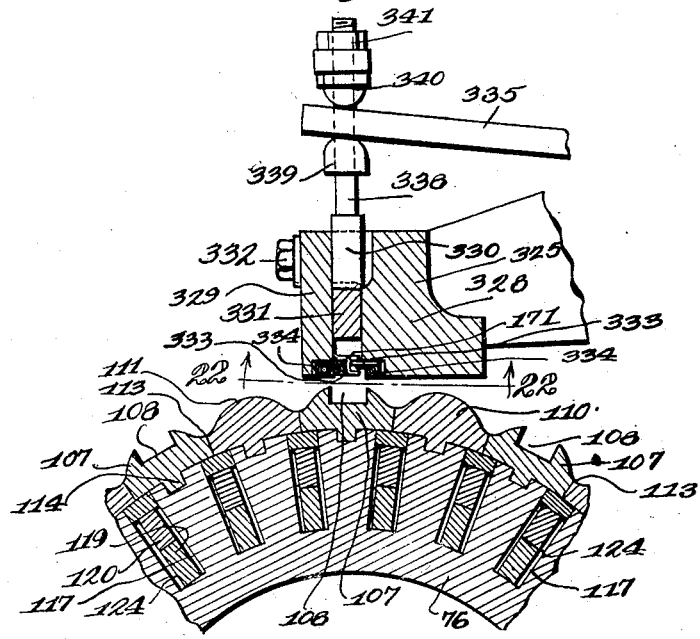
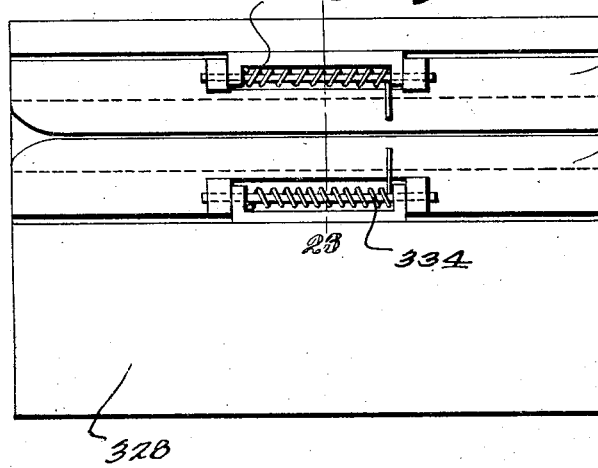
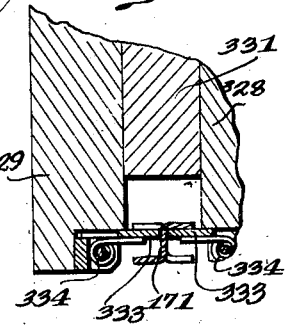

March 31, 1931.  E. S. HALL  1,798,531
MACHINE FOR MAKING PLASTER BASES OR SUPPORTS
Filed Feb. 11, 1928   25 Sheets-Sheet 16
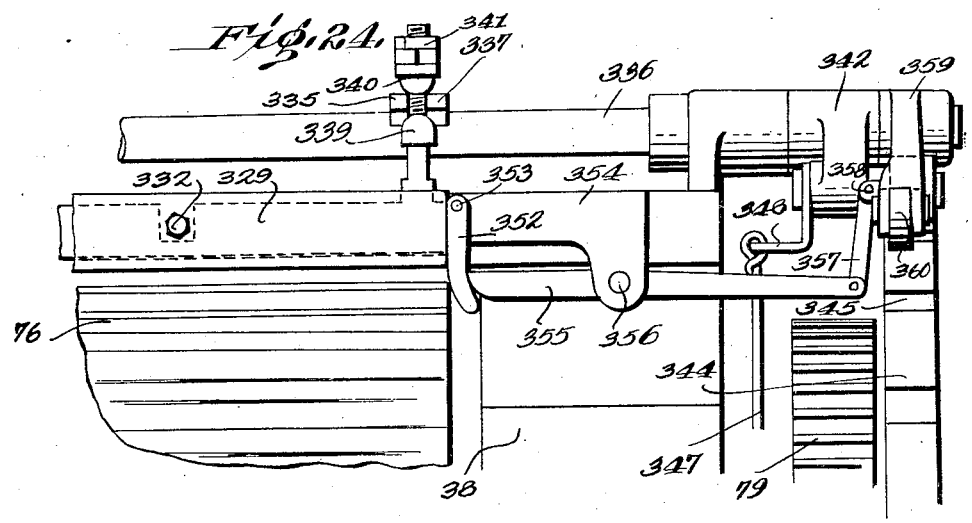
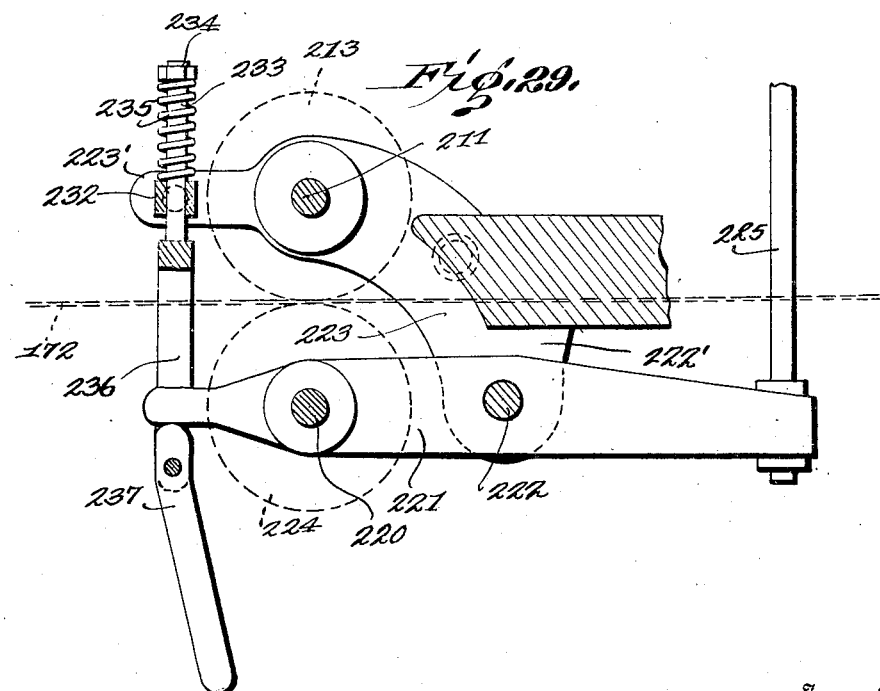
Inventor
Edward S. Hall
By Milans & Milans
Attorneys March 31, 1931. E. S. HALL 1,798,531
MACHINE FOR MAKING PLASTER BASES OR SUPPORTS
Filed Feb. 11, 1928 25 Sheets-Sheet 17
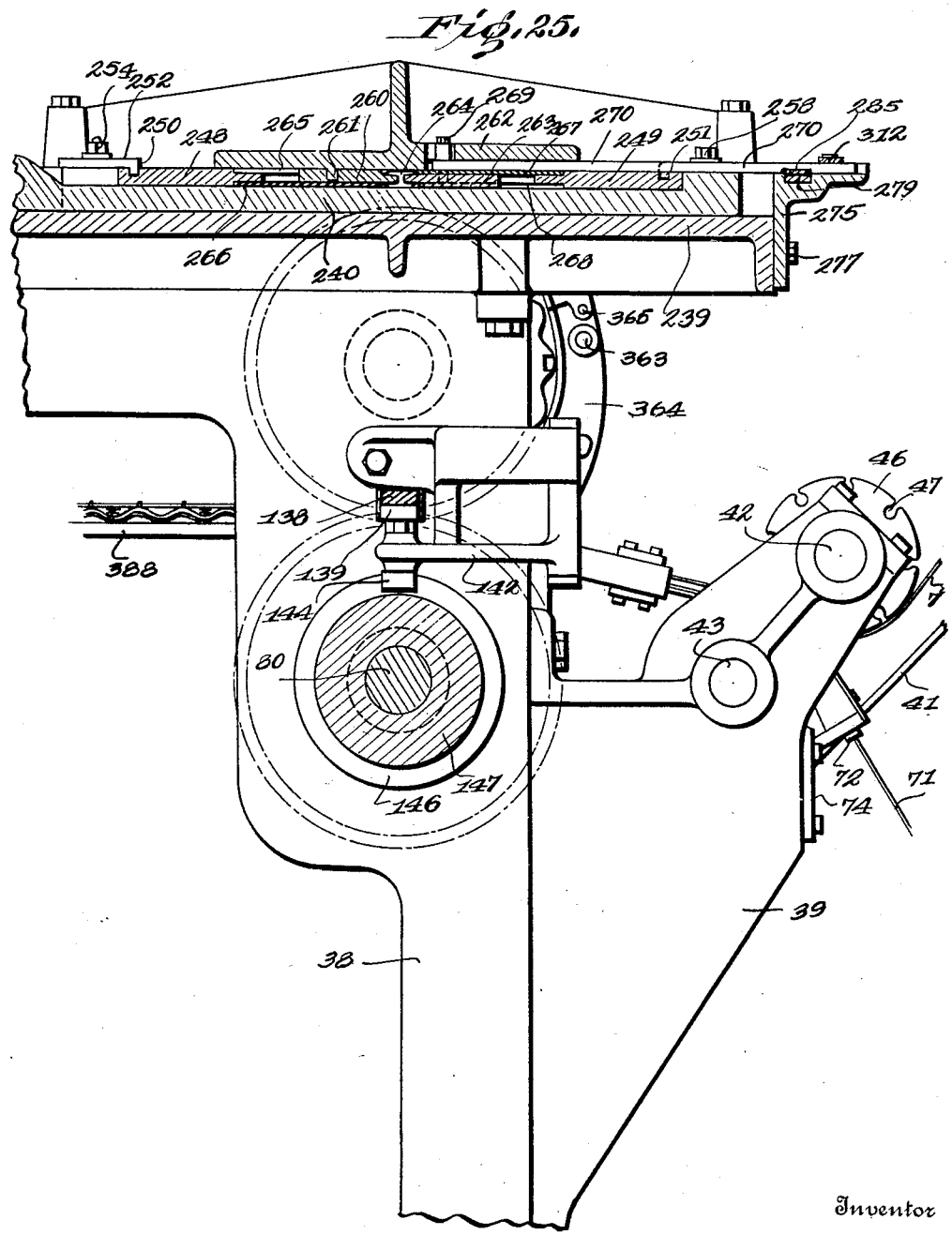
Inventor
Edward S. Hall

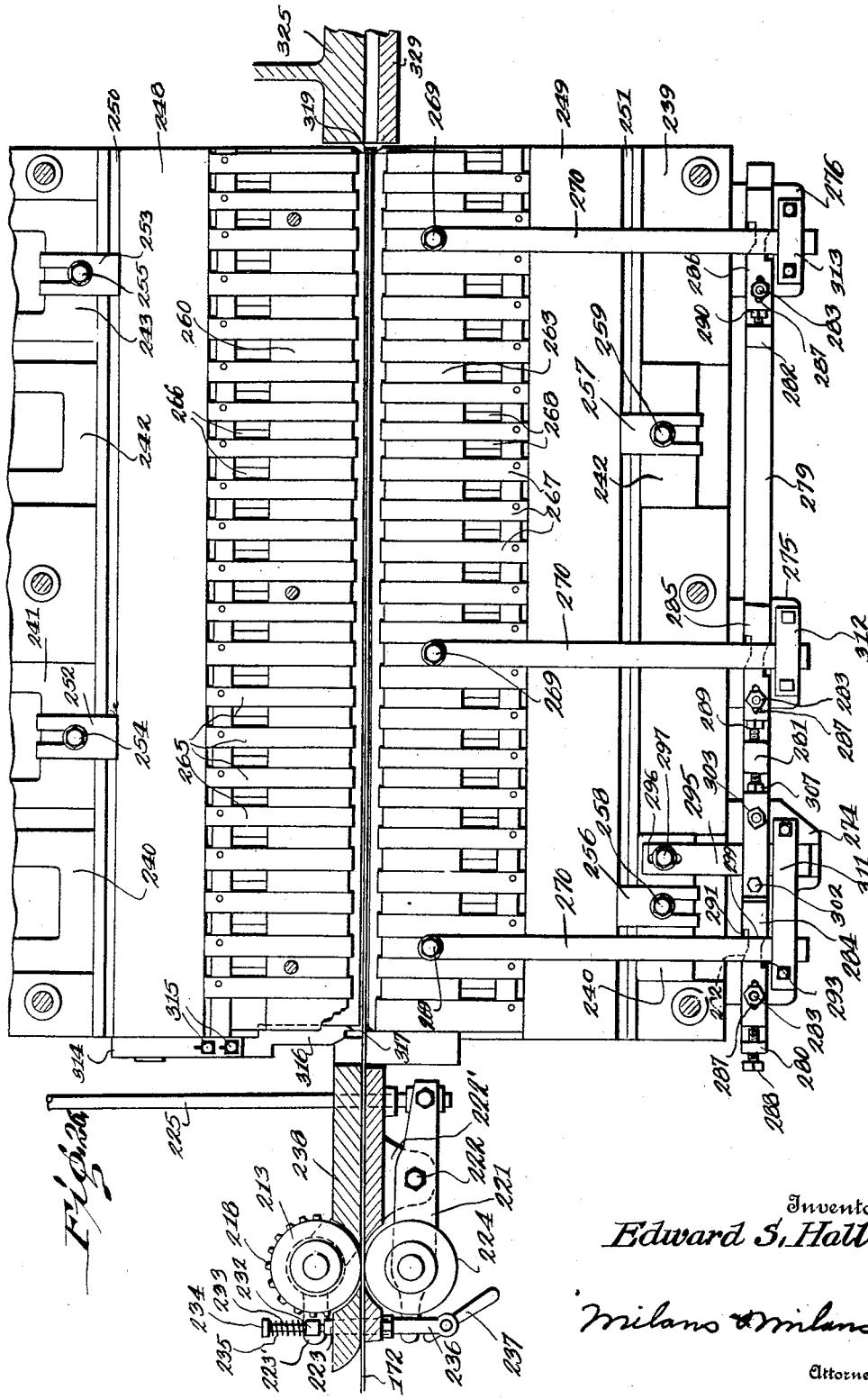

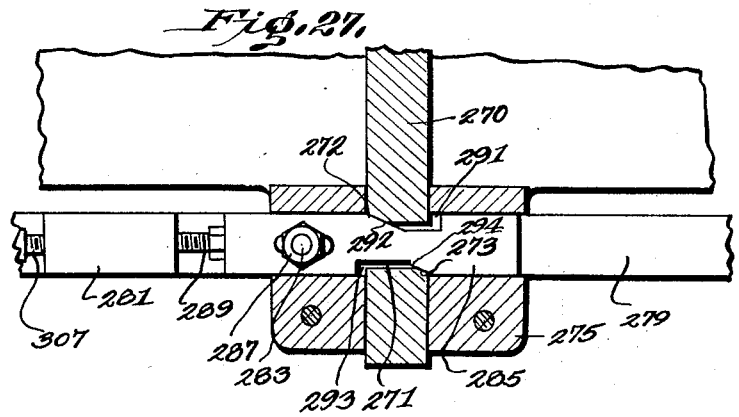
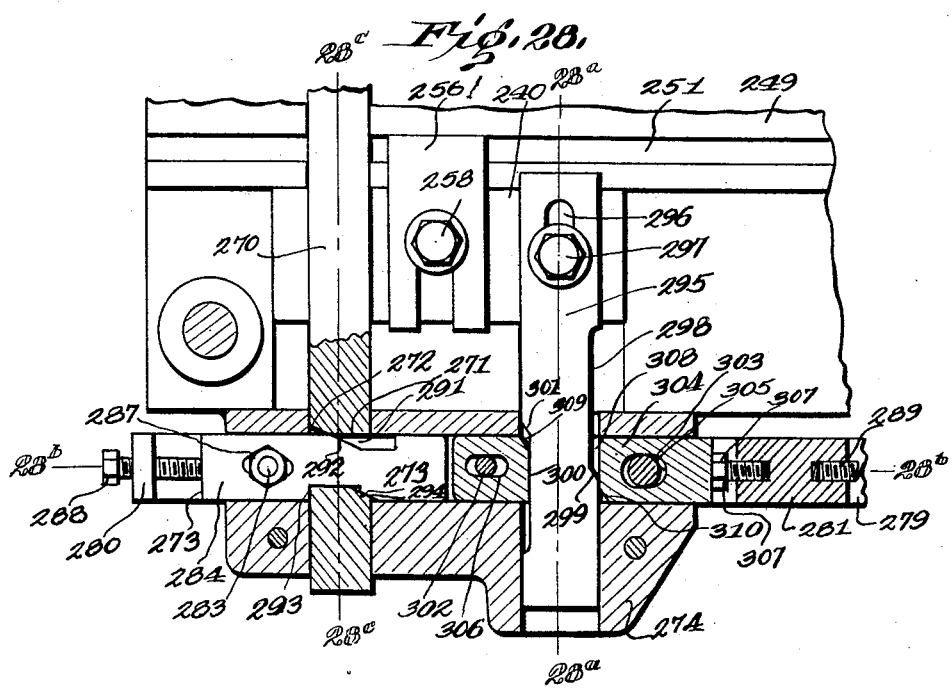

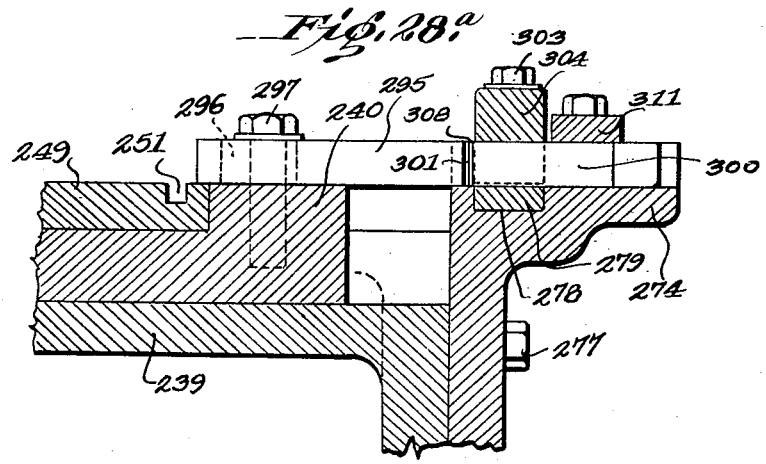
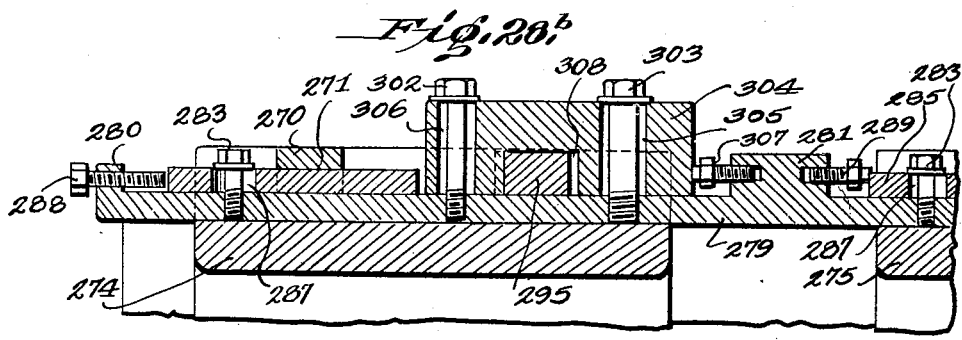
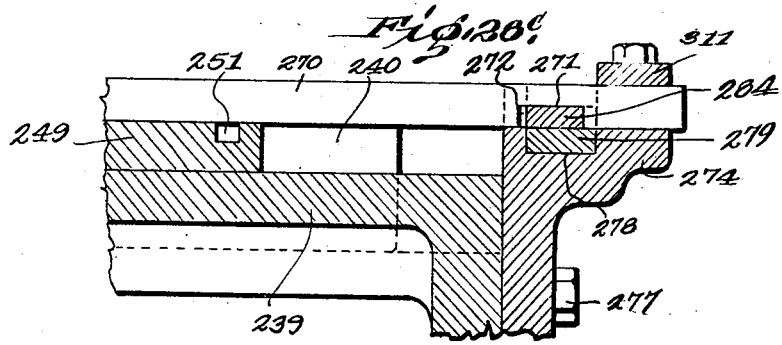

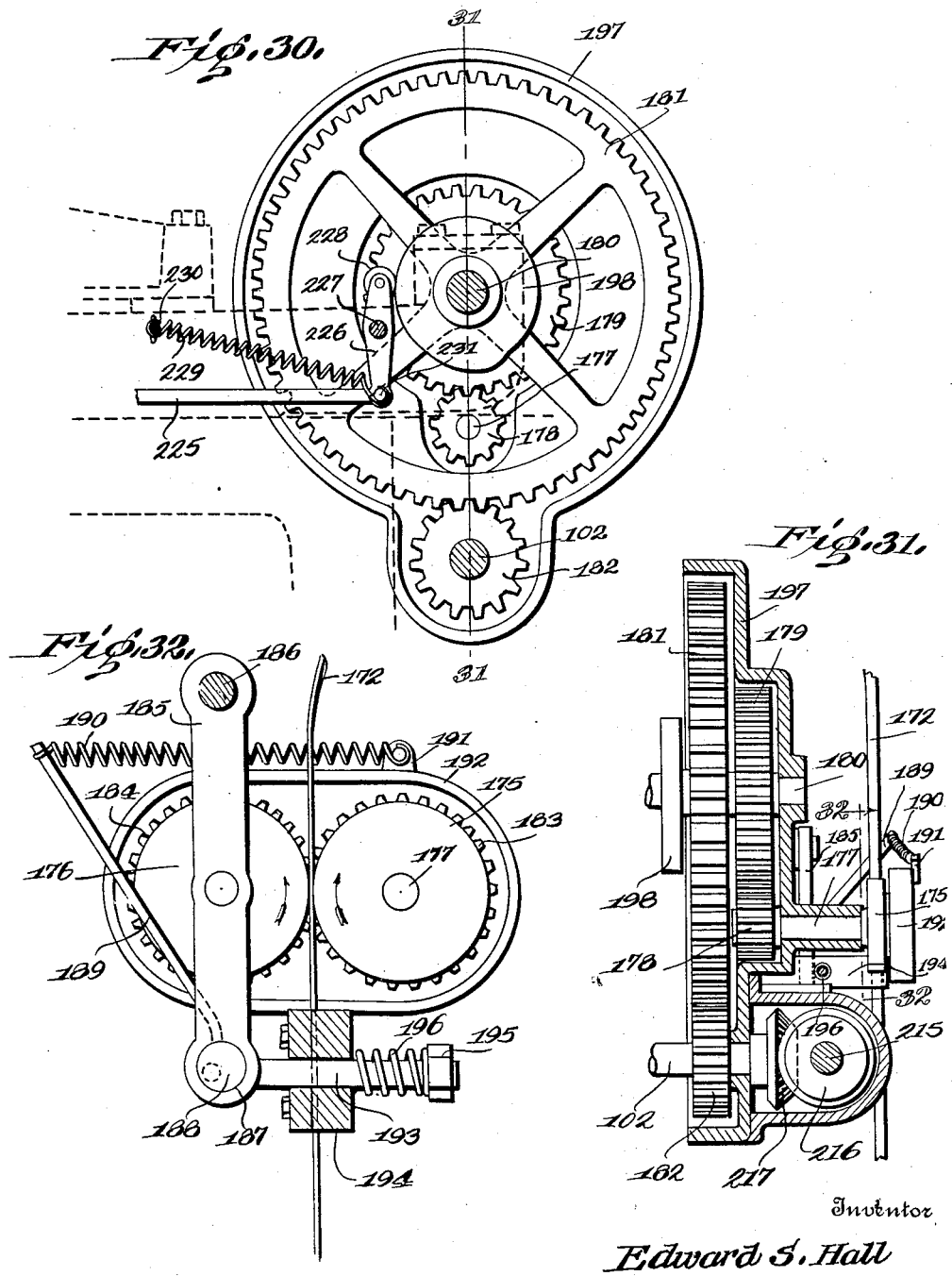

March 31, 1931. E. S. HALL 1,798,531
MACHINE FOR MAKING PLASTER BASES OR SUPPORTS
Filed Feb. 11, 1928 25 Sheets-Sheet 22
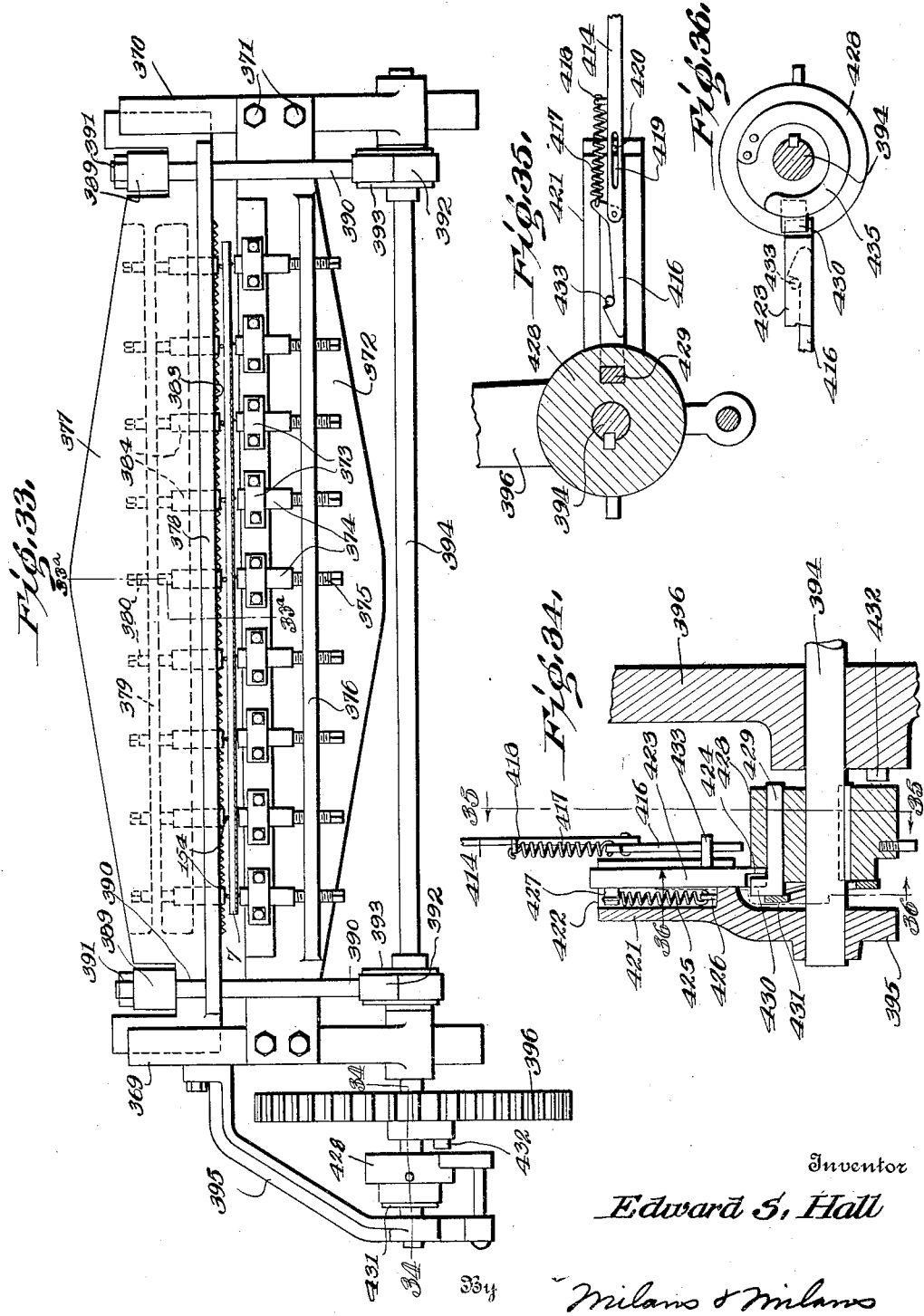
Inventor
Edward S. Hall
By Milans & Milans
Attorneys

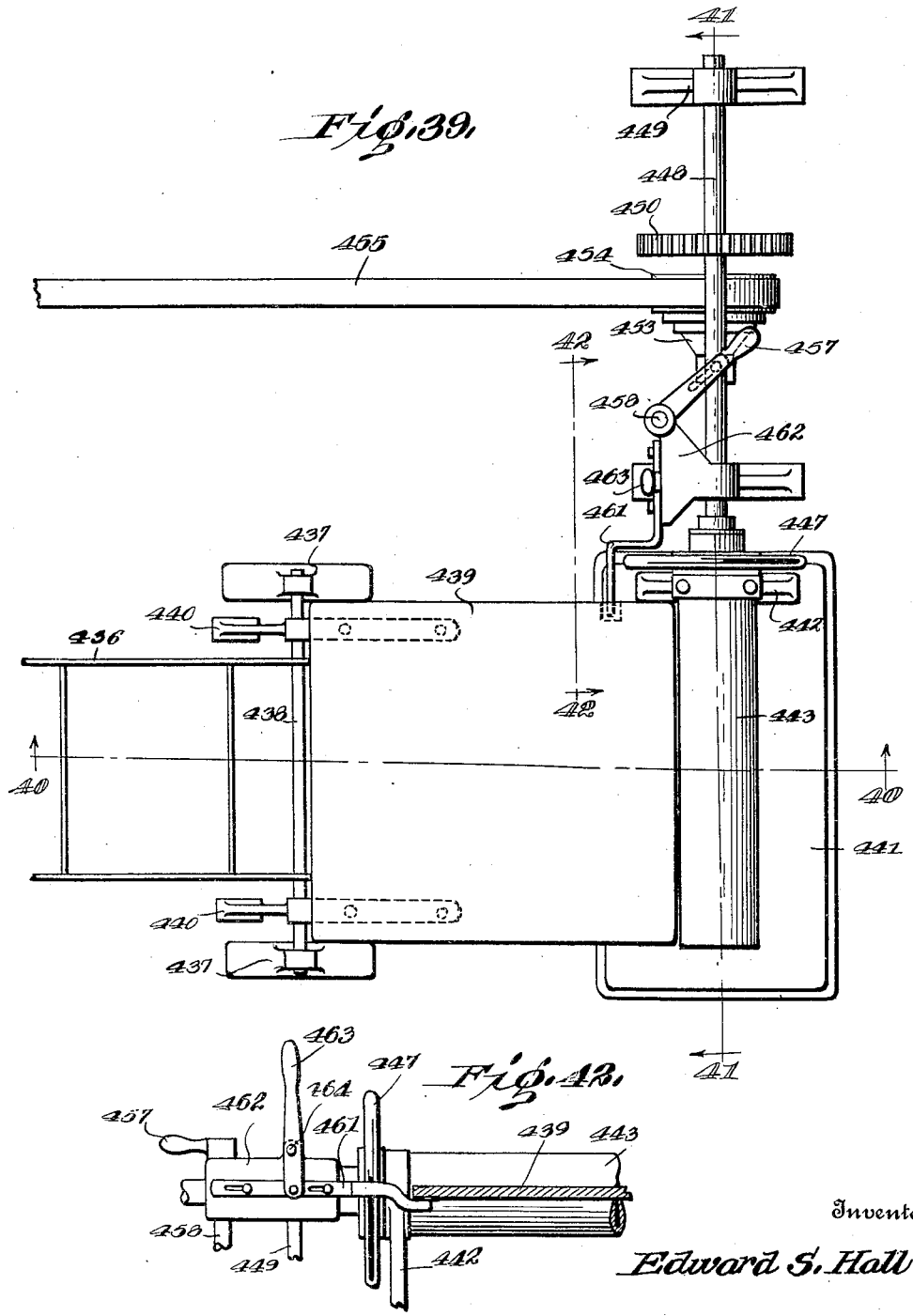

March 31, 1931.  E. S. HALL  1,798,531
MACHINE FOR MAKING PLASTER BASES OR SUPPORTS
Filed Feb. 11, 1928   25 Sheets-Sheet 24
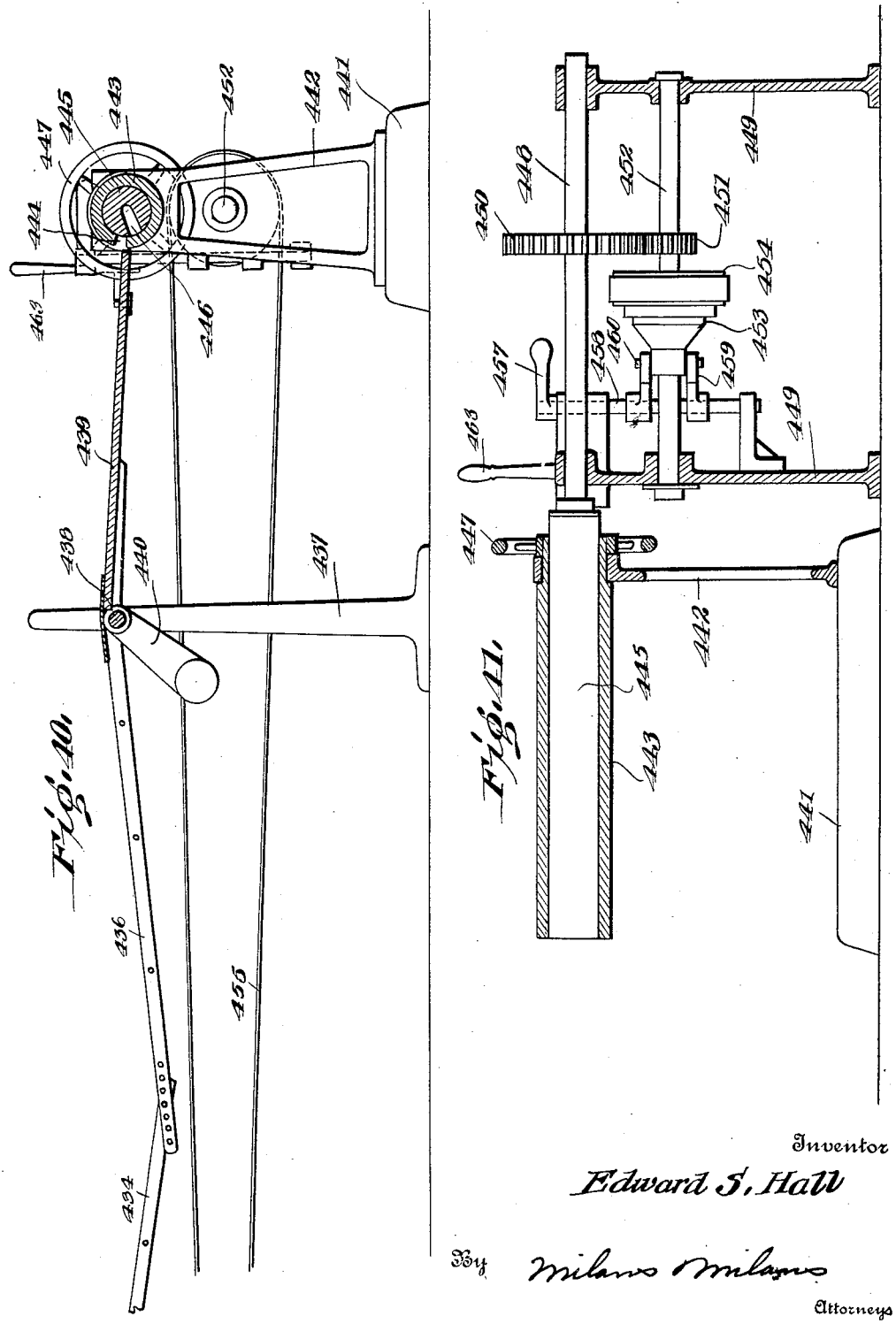
Inventor
Edward S. Hall
By Milans Milans
Attorneys Inventor
Edward S. Hall
By Milans & Milans
Attorneys Patented Mar. 31, 1931

1,798,531

UNITED STATES PATENT OFFICE

EDWARD S. HALL, OF HIGHLANDS, NEW JERSEY, ASSIGNOR TO MITCHELL HOLDING CORPORATION, OF NEW YORK, N. Y., A CORPORATION OF NEW YORK

MACHINE FOR MAKING PLASTER BASES OR SUPPORTS

Application filed February 11, 1928. Serial No. 253,740.

My invention relates to new and useful improvements in a machine for making plaster base or plaster support and more particularly to a machine for making plaster base or support of a character similar to that disclosed in my copending application filed January 20, 1925, Serial No. 3,605.

The principal object of the invention resides in the provision of a machine of the character described for forming the base or support in strips, means being provided to cut the strips into the desired lengths and to roll the same into compact form for shipment.

Another object of the invention resides in the provision of means for feeding a strip of material and securing thereon, at spaced intervals, laths, the strip of material being preferably of paper or the like and the lath being preferably of metal, although it will be understood that other materials might equally as well be used.

A further object consists in corrugating the strip of material as it is fed through the machine and depositing the laths in certain of the valleys formed by the corrugations, the laths being formed into proper shape prior to their deposit upon the strip.

Still another object of the invention resides in the provision of means for applying reinforcing wires longitudinally of the strip to hold the strip in proper shape and to hold the laths in position relative to the strip, certain of the wires extending longitudinally of what might be termed the bottom surface of the strip whereas the other wires extend longitudinally of the upper surface and over the metal laths.

A further object resides in the provision of wires extending longitudinally along opposed faces of the strip, the wires extending along one face being formed with loops which pass through the strip and engage and secure to the strip the wires extending along the opposed face thereof.

As another object of the invention I so position the wires, which extend longitudinally of the strip, relative to the laths that not only do these longitudinally extending wires hold the laths against the face of the strip against facewise movement away therefrom but they prevent displacement of the laths transversely of the strip.

With the above and other objects in view, which will appear as the description proceeds, my invention consists in the novel details of construction, and arrangement of parts, described in the following specification and claims and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation showing the entire assembly.

Fig. 2 is an enlarged side elevation of the forming and assembling portion of the machine.

Fig. 3 is an enlarged side elevation of the opposite side of the portion of the machine shown in Fig. 2.

Fig. 4 is a top plan of that portion of the machine illustrated in Figs. 2 and 3.

Fig. 5 is a vertical section on the line 5—5 of Fig. 4.

Fig. 6 is a transverse vertical section on the line 6—6 of Fig. 4.

Figure 43:
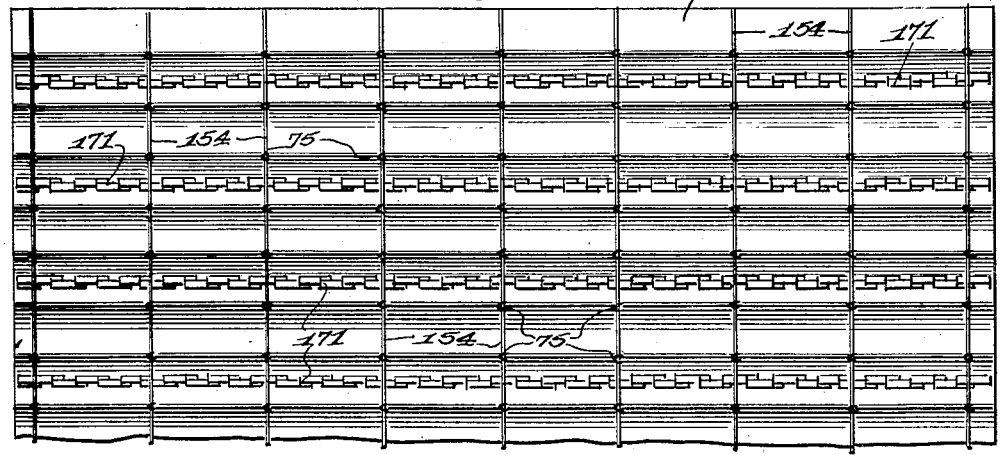

Fig. 6ª is a fragmental detail showing the stop for the tape from which the lath is formed.

Fig. 7 is a vertical section through the sheet material feeding mechanism.

Fig. 8 is a detail showing in side elevation the means for driving the sheet material feeding mechanism, this view being taken from a direction opposite to that illustrated in Fig. 7.

Fig. 9 is a fragmental plan of the sheet material roll and supporting means therefor.

Fig. 10 is a fragmental detail showing a section on the line 10—10 of Fig. 7.

Fig. 11 is a fragmental detail partly in section and partly in elevation of the loop forming mechanism.

Fig. 12 is a fragmental vertical section on the line 12—12 of Fig. 11.

Fig. 13 is a vertical section on the line

13—13 of Fig. 11 looking in the direction of the arrows.

Fig. 14 is a fragmental detail showing a section on the line 14—14 of Fig. 11.

Fig. 15 is a fragmental detail, enlarged, showing a vertical section on the line 15—15 of Fig. 6.

Fig. 16 is a fragmentary plan of the upper corrugating roller.

Fig. 17 is a section on the line 17—17 of Fig. 16.

Figs. 18, 19 and 20 are details showing different positions of the loop bending mechanism substantially on the line 18—18 of Fig. 16.

Fig. 21 is a fragmental detail partly in section and partly in elevation, enlarged, showing the lath dropping and receiving members.

Fig. 22 is a bottom plan looking in the direction of the arrows on line 22—22 of Fig. 21.

Fig. 23 is a fragmentary section on the line 23—23 of Fig. 22.

Fig. 24 is a fragmental elevation looking in the direction of the arrows on the line 24—24 of Fig. 2 and showing the mechanism for releasing the end of the lath.

Fig. 25 is an enlarged section on the line 25—25 of Fig. 6 looking in the direction of the arrows.

Fig. 26 is a top plan of the lath forming mechanism with the top plates removed and showing partly in section and partly in plan the mechanism for feeding the tape from which the lath is formed.

Figs. 27 and 28 are enlarged details, partly in plan and partly in section of the operating means for the tape clamping mechanism used in connection with the lath forming mechanism.

Figs. 28$^a$, 28$^b$ and 28$^c$ are details of the operating means for the lath forming mechanism on line 28$^a$, 28$^b$ and 28$^c$ respectively of Fig. 28.

Fig. 29 is a section on the line 29—29 of Fig. 3, looking in the direction of the arrows, showing in detail the supports for the tape feeding rollers.

Fig. 30 is a section on the line 30—30 of Fig. 4 illustrating the operating mechanism for releasing the tape feeding rollers.

Fig. 31 is a vertical section on the line 31—31 of Fig. 30.

Fig. 32 is a section on the line 32—32 of Fig. 31 looking in the direction of the arrows.

Fig. 33 is a face view of the mechanism for cutting the plaster base into sections looking in the direction of the arrows on the line 33—33 of Fig. 5.

Fig. 33$^a$ shows a section on the line 33$^a$—33$^a$ of Fig. 33.

Fig. 33$^b$ is a fragmental elevation of the upper cutter cross bar.

Fig. 34 is a fragmental section on the line 34—34 of Fig. 33.

Fig. 35 is a section on the line 35—35 of Fig. 34 looking in the direction of the arrows.

Fig. 36 is a section on the line 36—36 of Fig. 34 looking in the direction of the arrows.

Fig. 37 is a section on the line 37—37 of Fig. 2 looking in the direction of the arrows.

Fig. 38 is a section on the line 38—38 of Fig. 37 looking in the direction of the arrows.

Fig. 39 is a fragmental top plan of the outer end of the plaster base or support conveying and rolling mechanism.

Fig. 40 is a section on the line 40—40 of Fig. 39 looking in the direction of the arrows.

Fig. 41 is a section on the line 41—41 of Fig. 39 looking in the direction of the arrows.

Fig. 42 is a section on the line 42—42 of Fig. 39 looking in the direction of the arrows.

Fig. 43 is a plan showing a portion of the completed plaster base.

Figure 44:
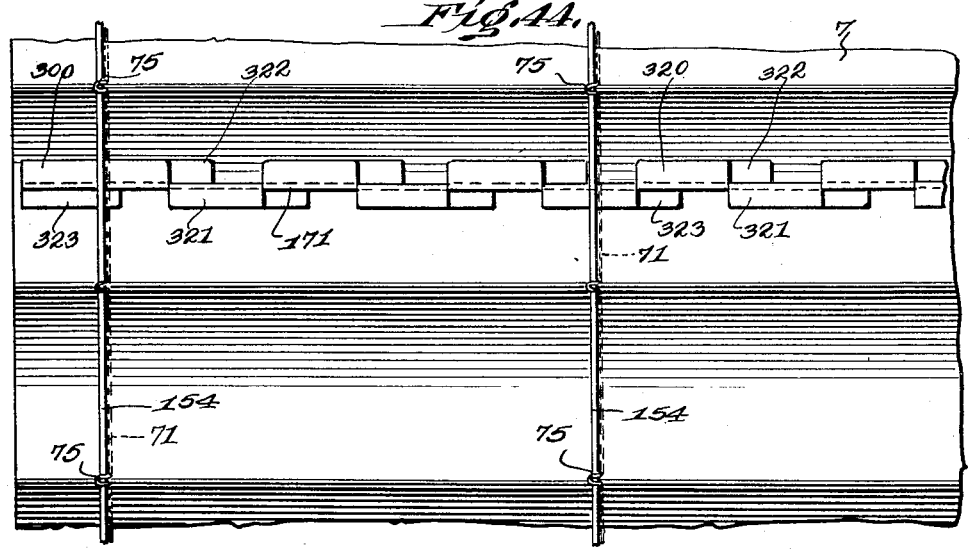

Fig. 44 is a fragmentary plan enlarged of a portion of the completed plaster base.

Figure 45:
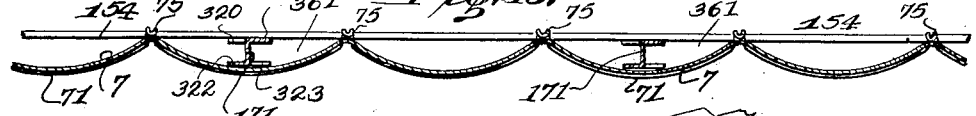

Fig. 45 is a side elevation of a portion of the completed plaster base; and

Figure 46:
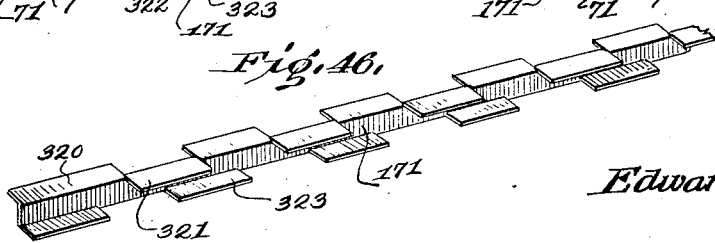

Fig. 46 is a perspective showing a portion of one of the laths.

In the drawings 1 indicates a standard secured to the base 2 by means of the bolts 3 or other suitable fastenings. Secured to the outer face of the standard 1, by means of the bolts 4 or other suitable fastenings, are the arms 5 of the bracket or support 6 forming a bearing for the roll 7 of paper or similar material from which the plaster base or support is to be formed. The paper will be relatively heavy and, if desired, may be coated on one or both faces with a waterproof composition. Secured to that face of the standard 1 to which the bracket or support 6 is secured, and spaced above the arms 5 of the bracket or support, is a plate or table 8 having an elongated opening 9 formed therein. This plate or table is used for straightening and connecting the ends of the strips of the material 7. It will be understood that when one roll of the material has become exhausted that a new roll will be positioned upon the bracket or support 6 and it will be necessary to connect the end of the new roll of material to the end of the material which has been withdrawn from the previous roll. The ends of the two strips of material will be overlapped upon the plate or table 8 and then a knife will be drawn through the overlapped ends of the material along the opening 9. This will straighten the adjacent ends of the two strips of material and the same may be connected by adhesive tape or in a similar manner. After passing from the roll 7 the material is carried under the roller 10, as more particularly illustrated in Figs. 1 and 7, and is then carried between the rollers 11 and 12 journaled in the standard 1 adjacent the upper end thereof. The roller 12 is slidably mounted in the standard by means of the journal blocks 13 and depending from each of the journal blocks is a bar 14, the bar being curved intermediate its ends, as shown at 15, to extend around the shaft supporting the roller 11. Extending transversely of the standard 1, beneath the roller 11, is a rod 16 having spaced recesses 17 into which the lower ends of the bars 14 are adapted to be normally received. Connected to each end of the rod 16 is a hand lever 18 by means of which the rod may be turned. With the lower ends of the bars 14 normally received in the recesses or notches 17 the roller 12 is in its lowermost position to engage the material passing over the roller 11. When it is desired to release the material the hand lever 18 is grasped, to rotate the rod 16 and this movement of the rod 16 causes the lower ends of the bars 14 to ride out of the recesses 17 onto the outer periphery of the rod. This movement will raise the bars 14 and consequently the roller 12. When the roller is to be again lowered the hand lever 18 is manipulated to allow the ends of the bars 14 to again drop into the recesses 17. Secured to one end of the shaft, which supports the roller 11, is a gear wheel 19 and secured to one end of the shaft, which supports the roller 12, is a gear wheel 20 which normally meshes with the gear wheel 19, as more particularly illustrated in Fig. 8 of the drawings. After passing from the rollers 11 and 12 the material is carried over the spaced rollers 21 and 22, supported by the transversely spaced brackets 23 secured to and extending inwardly from the inner face of the standard 1. Positioned between the rollers 21 and 22 are the vertically extending guide plates 24 secured to and supported by a bar 25 which in turn is supported by the brackets 23. After passing over the roller 22 the material passes over an inclined platform 26 which is secured to the brackets 23, by means of the straps or bands 27. Extending upwardly from each side edge of the platform 27 is a guide plate 28 and it will be understood that the material passes between these guide plates with the plates engaging the edges of the material. The material between the rollers 11 and 21 is adapted to drop to form a loop 29, as shown more particularly in Fig. 7 of the drawings, and received in this loop is the rod 30 which acts as a weight. It will be appreciated that this loop in the material allows for the necessary take-up in feeding the material to the machine and prevents damage thereto. As shown more particularly in Fig. 9 of the drawings, arms 31 are secured to the outer side faces of the bracket or support 6 and a threaded rod 32 is supported by each of these arms for adjustment. A socket member 33 is secured to the inner end of each of the threaded rods 32 and these socket members are adapted to receive the ends of the shaft 34 which supports the roll of material 7. The threaded rods 32 may be adjusted by means of the hand wheels 35 and at 36 I have illustrated a lock nut for holding the threaded rod in its adjusted positions.

Secured to and supported by the base 37 is a suitable framework indicated generally at 38, this framework being spaced from the standard 1 as more particularly illustrated in Fig. 1 of the drawings. Extending from that face of the frame 38, adjacent the lower end of the platform 26, are the brackets 39, these brackets being secured to the frame 38 by means of the bolts 40 or other suitable fastenings. Strips or plates 41 are secured to the brackets 39 and to the lower end of the platform 26, these plates or strips acting as a support for the lower end of the platform, as shown more particularly in Fig. 5 of the drawings.

Supported by the brackets 39, adjacent the upper ends thereof, are the horizontal shafts 42 and 43. Secured to the shaft 42, adjacent one end thereof, is a gear wheel 44 which meshes with a gear wheel 45 secured to the shaft 43. The arrangement of these gears is more particularly illustrated in Fig. 11 of the drawings. Also carried by the shaft 42 are the discs 46 having the transversely extending circumferentially spaced recesses 47 formed in the outer edges thereof for a purpose to be later described. Secured to the inner face of one of the brackets 39 is a plate 48 having a cam groove 49 as more particularly illustrated in Figs. 11 and 13 of the drawings. The plate 48 is so positioned that the end of the shaft 43 will pass therethrough although it will be understood that the plate will not rotate with the shaft. Secured upon the shaft 43 are the transversely spaced discs or plates 50, these discs or plates 50 being spaced upon the shaft to be below the discs 46 and in alignment therewith as shown more particularly in Fig. 11 of the drawings. Extending through the discs 50 and also through the gear 45 are the circumferentially spaced horizontal shafts 51 and to the ends of the shafts, adjacent the plate 48, are connected the crank members 52, the outer ends of which extend into the cam groove 49. The inner ends of the cam members are of sleeve formation so as to receive the ends of the shafts. The shafts 51 are rotatable in the discs or plates 50 and in the gear 45 for operating certain mechanism in a manner to be later described. Each of the discs or plates 50 is provided in its outer periphery with a circumferentially extending groove 53 and extending from one face of the disc or plate are the circumferentially spaced slots or recesses 54 and 55, the slots or recesses 54 being of a length greater than the length of the slots or recesses 55 and extending across the circumferentially extending groove 53, as shown more particularly in Figs. 11 and 14 of the drawings. As shown the slots or recesses 55 are of less depth than the slots or recesses 54 although of somewhat greater width than the peripheral ends of the recesses or slots 54. The slots or recesses 54 are of greater width inwardly of the peripheral ends as shown more particularly in Fig. 12 of the drawings and slidably mounted in each of these recesses or notches 54 is a plate 56 having a blade 57 secured thereto. The blade is of such a thickness as to readily pass through the narrow or peripheral ends of the recesses 54 and are of such a length as to extend into that portion of the recess or notch beyond the peripheral groove 53. Each of the plates 56 is provided with an opening or recess 58 in which the enlarged head 59 of a pin 60 is adapted to be received as more particularly illustrated in Fig. 12 of the drawings. These pins 60 extend through and are carried by the rotatable rods 51 and it will be appreciated that when the rods are rotated or oscillated that the plates 56 will be slid to eject the blades beyond the outer periphery of the discs 50 or to draw the blades within the notches or recesses 54. Extending through the discs or plates 50 are the circumferentially spaced rods 61 formed at each end with an enlarged head 62 adapted to be received in the slots or recesses 55. These enlarged heads 61 have their outer faces extending flush with the outer face of the disc 50 and the inner ends of the enlarged heads are so positioned that, when operated in a manner to be later described, they will engage and hold a wire which is received in the groove 53. A coiled spring 63 surrounds each of the rods 61 and normally forces the enlarged head 62 outwardly so that their outer ends normally extend beyond the face of the disc 50. The outward movement of the rod 61 is limited by a cotter pin or the like 64 which passes through the rod adjacent the end thereof. Supported adjacent that face of each of the discs or plates 50, through which the enlarged ends 62 of the rods 61 extend, is an arm 65 having a cam surface 66. As the discs or plates 50 are rotated the ends of the enlarged heads 62 engage the cam surface 66 and force the ends and rods 61 inwardly against the action of the coiled spring 63 to clamp the wire which is received in the groove 53 which will be later described. Supported adjacent the opposite face of each of the discs or plates 50 is a spring arm 67 which, as the discs or plates 50 are rotated, will engage the outer ends of the rod 61 to force the enlarged head 62 outwardly in such a position that the wire may be received within the groove 53 without obstruction. Normally the coiled spring 63 will force the enlarged heads outwardly and the spring arm 67 is provided only to make a positive operation in case the coiled spring does not properly function. At this point it might be stated that as the discs 50 rotate they carry with them the rods 51 and as the ends of the rod operate in the cam groove 49 they will function at the proper point so that one of the rods is rotated to eject that particular blade 57 which is operable by that rod. The particular manner in which the wire is fed to the grooves 53 and the manner in which the wire is operated upon by the blades 57 will be later described more in detail. Secured to that end of the shaft 52, adjacent the gear wheel 44, is a sprocket wheel 68 through which the shaft is rotated in a manner to be later described. The paper or material from the roll 7, after passing over the platform 26, is passed between the discs 46 and the discs or plates 50 as quite clearly shown in the drawings.

At 69 I have illustrated a support for a plurality of reels 70 upon each of which is wound a relatively fine wire 71 which is adapted to extend longitudinally of the strip of material 7 along the bottom surface thereof and to be secured to the strip in a manner to be later described. After being drawn from the reels 70 each of the strands of wire passes through a guide tube 72, as more particularly illustrated in Fig. 12 of the drawings, and from the guide tube the strand passes into the circumferentially extending groove 53 formed in the periphery of the disc or plate 50. It will be understood that the strands of the wire 71 are spaced transversely of the strip of material 7 and that each strand enters the groove 53 of a different disc or plate. As the operation upon the several strands 71 will be the same a description of one will suffice for all. The strand of wire is held in the groove 53, against accidental displacement, by means of a spring finger 73 as shown more particularly in Fig. 12 of the drawings. The wire is drawn from the reel by the rotation of the disc or plate 50 and in order that the wire may be properly clamped to be drawn with the disc the enlarged head 62 of the rods 61 are provided. As has been previously described the enlarged heads 62 are normally forced outwardly or away from the groove 53 by means of the coiled spring 63 but when the outer end of the enlargement 62 is engaged by the shoulder 66 of the arm 65 it is forced inwardly against the action of the coiled spring and will securely clamp the wire so that the same is withdrawn from the reel as the disc is rotated. It is desired to form loops in the strand of wire 71 and to force said loops through the material 7. This is done by sliding the plate 56 in the manner which has been previously described to project the blade 57 beyond the outer periphery of the disc or plate 50. As the blade is ejected it engages the wire, as shown more particularly in Fig. 12 of the drawings and forces the same through the material 7 into one of the notches or recess 47 formed in the disc or plate 46. As the disc or plate 50 is further rotated the plate 56 and its associated blade 57 will be withdrawn into the recess 53 and as the wire is again grasped by the clamping head 62 an additional length of wire will be fed during the rotation of the disc or plate. At this point I desire to particularly bring out that it is of considerable advantage to clamp the wire strand 71 at a point in front of the formed loop or loops and this prevents straightening out of the loop or distorting the same as the wire and material is fed between the discs 46 and 50. As has been previously described the spring arm or finger 67 is provided to make a positive operation of the rod 61 so that the head 62 will be projected out of the path of the groove 53 to allow the wire strand to be properly positioned within the groove. The tubes 72 through which the strands of wire 71 are passed are supported by means of the bracket 74. By reference, more particularly to Figs. 12 and 13 of the drawings, it will be seen that the cam groove 49 in the member 48 tends to position all of the plates 56 and associated blades 57 within the recesses of the discs 50 with the exception of the one plate and associated blade which is forcing the wire through the strip of material 7 and forming the loop. The formed loops, which have been forced through the material 7, are shown at 75 and when originally formed extend vertically and are of such a length as to project a short distance above the upper surface of the material for a purpose which will be later described.

After passing from between the discs 46 and 50, which act to form the loops, the material 7 with the wire strands connected thereto by the loops passing therethrough is fed between the corrugating rollers 76 and 77, the roller 76 being hereinafter referred to as the upper corrugating roller and the roller 77 being hereinafter referred to as the lower corrugating roller. As the material 7 passes between the two rollers it is corrugated as shown more particularly in Figs. 5 and 15. The upper corrugating roller 76 is mounted upon the horizontal shaft 78 to one end of which is secured a gear wheel 79. The lower corrugating roller 77 is mounted upon a horizontal shaft 80, parallel with the shaft 78, and secured adjacent one end of this shaft is a gear wheel 81 which meshes with the gear wheel 79. A sprocket wheel 82 is secured to that end of the shaft 80, adjacent the gear wheel 81, and to the opposite end of the shaft 80 is secured a worm gear 83, as shown more particularly in Fig. 6 of the drawings. A sprocket chain 84 engages with the sprocket wheel 82 and extends around the sprocket wheel 68 secured upon the shaft 42, around the idler sprocket wheel 85 and around the sprocket wheel 86 connected to the projecting end 87 of a shaft to be later described.

Supported by the framework 38 is an electric motor 88 driving the shaft 89 to which a pulley 90 is secured. Positioned adjacent the framework 38 is a standard 91 in which is journaled the vertically spaced shafts 92 and 93, as shown more particularly in Figs. 1 and 5 of the drawings. Secured on the shaft 92 is a pulley 94 and extending around the pulley 94 and the pulley 90 on the shaft 89 is a belt 95. It will thus be seen that the electric motor 88 through means of the pulleys 89 and 94 and the belt 95 rotates the shaft 92. Also secured upon the shaft 92 is a grooved pulley 96 which drives the belt 97 which passes around the groove pulley 98 secured to the shaft 93. The shaft 93 is thus rotated and secured to the shaft 93 is a pulley 99 which drives the belt 100 which also passes around the pulley 101 carried by what might be termed the main drive shaft 102. Secured upon the shaft 102 is the beveled gear 103 which meshes with a beveled gear 104 secured to the upper end of a diagonally extending shaft 105 on the lower end of which shaft, in a housing 106, is a worm gear which meshes with the worm gear 83 on the shaft 80. It will thus be seen that the shaft 80 carrying the roll 77 is rotated from the worm gear 83 which is driven from the main drive shaft 102 through means of the shaft 105. The upper roll 76, mounted upon the shaft 78, is driven from the shaft 80 supporting the lower roll through means of the meshing gears 79 and 81. The upper loop forming discs 46 are rotated through means of the shaft 42 which is driven through means of the sprocket gear 68 and chain 84 from the sprocket wheel 82 secured to the shaft 80 supporting the lowermost corrugating roll 77. The lower loop forming discs 50 are rotated with the supporting shaft 43, from the upper shaft 42 due to the meshing of the gear wheels 44 and 45, the gear wheel 44 being secured to the upper shaft 42 whereas the lower gear wheel 44 is secured to the lower shaft 43.

The outer periphery or face of the upper corrugating roll 76 is formed of a plurality of rows of plates, the plates of alternating rows being of similar constructions. The plates 107 which form alternating rows are formed with the longitudinally extending channels 108 and are detachably connected to the roll by means of the screws 109. The plates forming the intermediate rows, or in other words the rows between the rows of plates 107 are shown at 110. These plates have their outer surfaces curved to provide the convex enlargements 111 and the plates are detachably connected to the roll by means of the screws 112 or other suitable fastenings. The longitudinal edges of the plates of adjacent rows abut and the concaved valleys 113 are formed between the rows. The plates 107 are provided on their bottom surfaces with a longitudinally extending tongue 114 which is received within a groove formed in the roll and the plates 110 have similarly formed tongues received in grooves or recesses in the roll. Formed in the valleys 113 are the longitudinally spaced openings 116, as more particularly illustrated in Figs. 16 and 17 of the drawings, and the purpose of which will be presently described.

Formed in the roll 76 and communicating with the outer periphery of the roll, beneath the inner surfaces of the plates 107 and 110, and in alignment with the openings 106, are the longitudinally extending recesses 117 of the depth more particularly illustrated in Fig. 17 of the drawings. At this point it might be stated that the openings 116 formed in the valleys 113 are so positioned as to intersect the circumferentially extending grooves 118 formed in the outer surfaces or faces of the plates 107 and 110, these circumferentially extending grooves being more particularly illustrated in Figs. 15 and 16 of the drawings, and for the purpose which will be presently described.

Slidably mounted in each of the recesses 117 are the super-imposed bars 119 and 120, the bars being slidably mounted in the recesses and slidable one relative to the other. The bars 119 are formed adjacent one end with a notch 121 and a similar notch 122 is formed adjacent one end of the bars 120. As shown more particularly in Figs. 18, 19 and 20 of the drawings, the notched ends of the bars 119 extend somewhat beyond the notched ends of the bars 120 for a purpose which will be later apparent. Secured to each side face of the bars 119, by means of the rivets 123 or other suitable fastenings, are the longitudinally spaced plates 124 of the shape more particularly illustrated in Fig. 18 of the drawings and each of the plates is provided on its outer edge with a notch forming a hook 125, these hooks being directed towards the circumferentially extending grooves 118 formed in the plates 107 and 110. At this point it might be stated that there will be one of the plates 124 normally positioned adjacent each of the circumferentially extending grooves 118. Secured to the outer edge of each of the bars 120, by means of the screws 126 or other suitable fastenings, are the longitudinally spaced plates 127, each of the plates being provided in its outer face with a notch 128 to receive the projection 129 formed on the outer face of the substantially semi-circular member 130 having one edge 131 pointed as shown more particularly in Fig. 19 of the drawings. These substantially semi-circular members 130 are adapted to oscillate about the longitudinally spaced rods 132, the outer face or surface of each of the rods 32 being flattened as shown at 133 and formed with the longitudinally extending cut-out portion 134 forming the vertically extending shoulder 135 and the horizontally extending shoulder 136. The ends of the rods 132 are reduced as shown at 137 and are preferably semi-circular in shape as shown more particularly in Fig. 18 of the drawings. The reduced ends 137 extend through the plates 124 adjacent the hooked ends thereof, and the rods are thus held against rotary or oscillating movement.

The bars 119 and 120 are adapted, as has been previously described, to be slid in the recesses 117 and also slid relative to one another. Normally the bars will be in the position shown more particularly in Fig. 18 of the drawings and it will be understood that they are carried in a rotary movement with the roll 76. Slidably mounted in the framework 38, adjacent one end of the roll 76, and in alignment substantially with the bottom of the roll, are the super-imposed slidable members 138 and 139. These members are more particularly illustrated in Fig. 6 of the drawings and as shown the member 138 is provided on its inner end with an upturned portion 140 and the member 139 is provided at its inner end with a similar upturned portion 141. The upturned portion 140, of the member 138, is adapted to be received in the notches 121 formed in the bars 119 and the upturned portion 141, of the member 139, is adapted to be received in the notches 122 formed in the bars 120. The member 138 is somewhat longer than the member 139 so that the outer end of the member 138 extends beyond the outer end of the member 139. The member 139 is adapted to be reciprocated by the swinging arm 142, as shown more particularly in Fig. 25 of the drawings, whereas the member 138 is adapted to be reciprocated by means of a similar swinging arm 143, the relative position of the arms 142 and 143 being illustrated in Fig. 6 of the drawings. The arm 142 is provided with the depending roller 144 and the arm 143 is provided with a similar depending roller 145. The roller 144 is adapted to operate in the cam groove 146 formed in the sleeve 147 this sleeve being rotatably mounted about the shaft 80. The depending roller 145 operates in a cam groove 148. Secured to the outer end of the sleeve 147 is a sprocket wheel 149 and extending around this sprocket wheel is a sprocket chain 150 which is driven from the main drive shaft 102 by the sprocket wheel 151. It will thus be seen that the sprocket 147 is rotated on the shaft 80 through means of the sprocket chain 150 driven from the main drive shaft 102. As the sleeve 147 rotates through means of the cam grooves, and the rollers received therein, the members 138 and 139 are reciprocated and will slide the bars 119 and 120 which are in alignment therewith and in whose notches 121 and 122 the projections 140 and 141 are received. It will be understood that the rotation of the roll 76 successively brings the pairs of bars 119 and 120 in position to be engaged with and reciprocated by the members 138 and 139.

Rotatably carried by the supports 152 are the reels 153 upon which are wound the strands of wire 154. It will be understood that the same number of strands of wire 154 will be used corresponding to the number of the strands of the wire 71 and that the number of these strands will be equal to the number of circumferentially extending grooves 53 formed in the discs or plates 50 and the circumferentially extending grooves 118 formed in the roll 76. While, in Fig. 1 of the drawings, I have only illustrated some five supports 152 it will be understood that there will be a larger number than this and possibly nine to accommodate the strands of wire as illustrated in Fig. 4 of the drawings. I have also illustrated the supports 152 as being suspended from above but it will be understood that the supports may be positioned at any desired point just so long as the wire strands may be properly fed from the reels. After passing from the reels the strands of wire pass through eyes formed in the transversely extending bar 155, this bar being supported, as shown more particularly in Fig. 4 of the drawings, by means of the brackets 156. After passing through the eyes in the bar 155 the strands of wire pass through the transversely spaced sleeves 157 and from the sleeves 157 the strands of wire enter the circumferentially extending grooves 118 formed in the roll 76. The strands of wire are fed through the sleeves 157 and drawn from the reels 153 by means of the transversely spaced pairs of knurled rollers 158 and 159, the surfaces of each pair of rollers passing through openings formed intermediate the ends of the sleeves, as shown more particularly in Fig. 5 of the drawings. The lower rollers 158 are mounted on the horizontal transversely extending shaft 160 whereas each of the upper rollers 159 is rotatably carried by an arm 161 pivotally connected to a rod 162. The arms 161 are adapted to be swung upon their pivot to raise the rollers 159 when it is desired to release the rollers from the strands of wire. The arms may be all simultaneously raised, in a manner to be later described, or they may be individually raised. For simultaneously raising the arms I provide the rotatable rod 163 which extends transversely of the machine and beneath the arms adjacent their outer free ends. This rod is provided with a flattened surface 164 upon which the bottom edges of the arms normally rest as shown more particularly in Fig. 5 of the drawings. When the rod 163 is rotated, through means of the hand lever 165, the arms will be raised as will be apparent and release the upper rollers 159 from the wire strands. For individually raising the arms I provide each of the arms with a cam lever 166 the cammed end of which normally engages the flattened surface 164 of the rod 163. If this cam lever 166 is operated it will tend to raise the individual arm to which it is connected. For normally holding the arms in their lowered position I provide a plurality of transversely spaced vertically extending posts 167 and a post extends through a vertically extending opening in each of the arms 161, as shown more particularly in Fig. 5 of the drawings. A coiled spring 168 surrounds each of the posts 167 with its lower end bearing upon the upper surface of the arms 161 and its outer end engaging an adjustable nut 169. It will thus be seen that the coiled springs 168 normally hold the arms in their lowermost positions and when the arms are raised the springs are placed under compression. The shaft 160 has the projecting end 87, previously described, to which the sprocket wheel 86 is connected and the shaft 160 is thereby rotated through means of the sprocket chain 84. The rotation of the shaft 160 in turn rotates the rollers 158 and the upper rollers 159 have secured thereto the gear wheels 170, shown more particularly in Figs. 2 and 4 of the drawings, which mesh with aligned gear wheels, not shown, carried by the lower shaft 160. It will thus be seen that the upper and lower rollers 158 and 159 are simultaneously rotated for feeding the wire strands 154. As the upper corrugating roll 76 rotates it carries with it the strands of wire 154 and positions these wires over the upper surface of the material 7 which passes between the corrugating rolls 76 and 77. The strands of wire 71 are connected to the under surface of the material 7 and, of course, it will be understood that the strands 154 as well as the strands 71 extend longitudinally of the material and the strands 154 will be in a position adjacent the loops 75 which are formed in the strands of wire 71 and extend through the material 7. The loops 75 are adapted to be bent around the strands of wire 154 by the operation of the slidable bars 119 and 120 in a manner to be later described. The strands of wire 154 are preferably somewhat heavier or of a greater diameter than the strands 71. When the material 7 has been corrugated the loops 75 will preferably extend therethrough at the ridge portions as shown more particularly in Fig. 15 of the drawings.

In making the plaster base or support metal laths are adapted to be secured to one face of the strip of paper 7 or similar material, the laths being indicated generally at 171 more particularly in Figs. 15 and 23 of the drawings. These laths extend transversely of the strip and are longitudinally spaced thereon, as shown in the drawings, the laths being received in the valleys of the material formed by the corrugating rollers 76 and 77. Preferably the laths will be received in every other valley and will be secured therein by means of the wire strands 154 which are secured over the laths and to the material by bending of the loops 75 of the wire strands 71 around the wires 154. The laths 171 are formed from a flat metal tape indicated at 172. The tape is carried by a reel 173 which is rotatably supported on the axis 174 supported in any desired manner. This reel with the tape wound thereon is more particularly illustrated in Figs. 3 and 6 of the drawings. The tape 172 is fed from the reel 173 by means of the feed rolls or discs 175 and 176. The roll or disc 175 is secured to the shaft 177 and secured to the inner end of this shaft is a pinion 178 which meshes with the gear 179 carried by the shaft 180. Also carried by the shaft 180 is a gear wheel 181 which meshes with the pinion 182 secured upon the main drive shaft 102. This arrangement of gears and pinions is illustrated more particularly in Figs. 30 and 31 of the drawings. Secured to the roll or disc 175 is a gear wheel 183 which meshes with a gear wheel 184 secured to the roll or disc 176. It will thus be seen as the roll or disc 175 is driven from the main drive shaft 102 through means of the gears and pinions 178, 179, 181 and 182 that it in turn will drive the roll or disc 176 due to the intermeshing of the gears 183 and 184. These rolls or discs 175 and 176 are rotated in the direction of the arrows indicated in Fig. 32 of the drawings. The roll or disc 176 is rotatably carried by the arm 185 pivotally mounted at 186. The opposite end of the arm 185 is provided with an opening 187 in which the cam 188 is adapted to operate. Secured to the cam 188 is the lever 189 to the upper end of which is connected one end of a coiled spring 190, the opposite end of the coiled spring being connected to an ear 191 secured to the casting 192 which houses the gears 183 and 184. Secured to the lower end of the arm 185 is a rod 193 which passes through a block or casting 194, as shown more particularly in Fig. 32 of the drawings. Secured to the outer threaded end of the rod 193 is a nut 195 and a coiled spring 196 surrounds the rod between one face of the block or casting 194 and the inner face of the nut 195. The coiled spring 196 normally tends to hold the roll or disc 176 in close proximity to the roll or disc 175 so that the tape 172 will be engaged by both of the rolls or discs for proper feeding. The coiled spring 190 also draws the arm 189 inwardly to draw the cam 188 in such a position as to swing the arm 185 on its pivot 186 to position the roll or disc 176 adjacent the roll or disc 175. When it is desired to release the tape the lever 189 is grasped and the cam 188 rotated within its opening 187. This movement will pull upon the spring 190 and at the same time the cam 188 will swing the arm 185 on the pivot point 186 to draw the roll or disc 176 away from engagement with the tape 172. As the lower free end of the arm 185 is swung outwardly it will naturally draw the rod 193 with it and thus place the coiled spring 196 under compression. When the lever 189 is released the coiled spring 190 will return the lever and its associated cam 188 to its original position and carry the roll or disc 176 towards the roll 175 and in proper position to engage and feed the tape. A casing 197 houses the gears and pinions 178, 179, 181, and 182, as more particularly illustrated in Figs. 30 and 31 of the drawings, and this casing forms a bearing for the shaft 177 and for the end of the shaft 180.

Secured upon the shaft 180 is the cam 198 for a purpose which will be presently described. The shaft 180 extends inwardly towards the longitudinal center of the machine and is provided at 199, 200, 201 and 202 with the crank arms as shown more particularly in Fig. 4 of the drawings. Also secured upon the shaft 180, preferably at a point between the crank arms 200 and 201, is a pulley 203 around which one end of a drive belt 204 extends as shown more particularly in Fig. 5 of the drawings. One flight of the drive belt passes over a pulley 205 and the other flight extends over a pulley 206 which is supported upon a standard 207 rising from the top surface of the machine. The opposite end of the belt 204 extends around a pulley 208 which is rotatably mounted upon the shaft 209, as shown more particularly in Figs. 1, 7 and 8 of the drawings, a pinion 210 being also mounted upon the shaft 209 and meshing with the gear wheel 20 which is secured to the shaft supporting the upper roll 12 which feeds the paper or similar material from the roll 7. It will thus be seen that through means of the drive belt 204 the feeding mechanism for the paper or similar material 7 is operated.

After the tape 172 has been fed from the reel 173 by the discs or rollers 175 and 176 it is desired to feed the same to the lath forming mechanism to be later described in a vertical position and at the same time to feed the tape periodically and at a relatively fast rate through the lath forming mechanism. The feed from the reel 173 by the discs or rolls 175 and 176 is constant whereas the feed to the lath forming mechanism will be periodic. The feed from the reel being constant a surplus of tape will be provided above the feed discs or rolls 175 and 176, as more particularly illustrated in Figs. 3, 4 and 6 of the drawings. The mechanism for feeding the tape through the lath forming mechanism, in a vertical position, is more particularly illustrated in Figs. 3, 4, 6 and 31 of the drawings. Supported upon the vertically extending shaft 211, which in turn is mounted in the bearing 212, secured to the framework of the machine, is a horizontally positioned feed roller or disc 213. Adjacent the lower end of the shaft 211 is a beveled gear 214 which is driven through means of a beveled gear, not shown, secured to the end of the horizontal shaft 215, shown more particularly in Fig. 3 of the drawings. Secured to the opposite end of this shaft 215 is a beveled gear 216 which meshes with and is driven from a beveled gear 217 secured to the end of the main drive shaft 102, as shown more particularly in Fig. 31 of the drawings. Secured to the shaft 211 beneath the roller or disc 213 is a gear 218 which normally meshes with and drives a gear wheel 219 supported upon an axis 220 carried by the arm 221 pivotally mounted at 222 to an ear 222' formed on a supporting arm 223 extending from the framework of the machine, as shown more particularly in Fig. 4 of the drawings. The supporting arm 223 also has an opening through which the shaft 211 passes and an extension 223' for a purpose to be later described. Also carried by the axis 220 is a disc or roller 224 which is adapted to be positioned into close proximity with the disc or roller 213 for engaging the tape 172 therebetween to feed the tape to the lath forming mechanism. Secured to the inner end of the arm 221 is the rod 225, the opposite end of said rod being secured to the lower end of the lever 226 pivotally connected at 227 adjacent the cam 198 as shown more particularly in Fig. 30 of the drawings. A roller 228 is secured to the upper end of the lever 226 and is adapted to be held in engagement with the surface of the cam 198 by means of the coiled spring 229, one end of this coiled spring being connected at 230 to the frame of the machine and the opposite end being connected to the lower end of the lever 226 as more particularly illustrated at 231. Formed on or secured to the extension 223' of the arm 223 is the upwardly extending lug or projection 232 having a horizontally extending opening through which the reduced extension of a slidable bar 233 is adapted to extend as shown more particularly in Fig. 29 of the drawings. A nut 234 is carried on the outer end of the reduced extension 233 and a coiled spring 235 surrounds the extension between the lug or projection 232 and the nut 234. The outer end of the bar 233 is forked as shown at 236 and is adapted to straddle the outer free end of the arm 221 as shown more particularly in Fig. 29. Pivotally connected in the forked end 236 is a latch lever 237 which is adapted to engage the outer end of the lever 221 to normally urge the lever with its roller or disc 224 toward the roller or disc 213. When the rod 225 is operated by the cam 198 it will draw the end of the lever 221, to which the rod is attached, inwardly to in turn move the disc or roller 224 in a direction away from the disc or roller 213 against the action of the coiled spring 235. This movement of the disc or roller 224 releases the tape 172. The roller or disc 224 may be permanently released from engagement with the tape by swinging the latch lever 237 to release the outer free end of the lever 221. At the same time an adjustment may be secured by loosening or tightening the nut 234. At 238 I have illustrated a guideway having a longitudinally extending opening or recess through which the tape 172 passes and this guideway is formed intermediate its ends with notched or recessed portions through which the discs or rollers 213 and 224 extend, as shown more particularly in Fig. 26 of the drawings, to properly engage and feed the tape.

After passing through the guideway 238 the tape is ready to be positioned relative to the mechanism for forming the lath 171 and this particular mechanism is more particularly illustrated in Figs. 25, 26, 27 and 28 of the drawings. The lath forming mechanism includes a table or bed 239 upon which are slidably mounted the plates 240, 241, 242 and 243 which are connected respectively to the crank portions 199, 200, 201 and 202 of the shaft 180 by means of the connecting rods 244, 245, 246 and 247, this being shown more particularly in Fig. 4 of the drawings.

Slidably mounted over the plates 240, 241, 242 and 243 are the longitudinally extending plates 248 and 249 and in further describing these plates I will hereinafter refer to the plate 248 as being the back plate and the plate 249 as being the front plate. The plate 248, adjacent its outer edge, is formed in its upper face with a longitudinally extending groove or recess 250 and the plate 249 is formed with a similar groove or recess 251. Hook members 252 and 253 have their vertically extending portions received in the groove or recess 250 and their horizontally extending portions are forked to receive the screws or bolts 254 and 255 which secure the hook members respectively to the slidable plates or members 241 and 243 which have the connecting rods 245 and 247 secured thereto, the opposite ends of these connecting rods being connected respectively to the crank arms 200 and 202 of the shaft 180. Hook members 256 and 257 have their vertically extending portions received in the groove or recess 251 formed in the front plate 249 and the horizontal portions of these hook members are forked to receive the screws or bolts 258 and 259 respectively by means of which the hook members are secured respectively to the slidable plates 240 and 242. Connecting rods 244 and 246 are connected respectively to the plates 240 and 242 and the opposite ends of these connecting rods are secured respectively to the crank portions 199 and 201 of the shaft 180. Thus as the shaft 180 is rotated, through means of the connections just described, the plates 248 and 249 are slid towards or away from one another and carry the parts or mechanism to be later described for forming the lath. Positioned forwardly of the inner longitudinal edge of the rear slidable plate 248 is a plate 260 which is held against sliding movement by the depending lugs or projections 261 formed on the under surface of a top plate 262 which overlies a portion of the slidable plates 248 and 249, and associated mechanism, as more clearly illustrated, in Fig. 25 of the drawings. Positioned forwardly of and spaced from the inner edge of the slidable front plate 249 is a plate 263 adapted for slidable movement. Normally the plates 260 and 263 have their inner edges spaced apart as shown at 264 in Fig. 25 of the drawings so that the tape may be readily received therebetween. When the plate 263 is slid, in a manner to be later described, the forward edge thereof will engage the side surface of the tape and the tape will be clamped between the inner edges of the plates 260 and 263. Carried by and extending inwardly from the slidable back plate 248 are a plurality of longitudinally spaced top blades or knives 265 and a plurality of longitudinally spaced bottom blades or knives 266, the top and bottom blades being in staggered relation. The blades 265 and 266 operate through recesses formed in the upper and bottom surfaces of the plate 260. Carried by and extending inwardly from the slidable front plate 249 are the longitudinally spaced upper or top blades or knives 267 and the longitudinally spaced bottom blades or knives 268, the knives of the top and bottom series being in staggered relation and in staggered relation to the blades or knives carried by the plate 248 for a purpose which will be later apparent.

Secured to the slidable plate 263, by means of the screws or bolts 269, are the longitudinally spaced rods or bars 270 formed in their under surfaces, adjacent their outer ends, with notches or recesses 271 for a purpose to be later described. The inner edge of each of the recesses 271, at one end, is formed with a beveled surface 272 and the forward edge of each of the recesses is formed, at the opposite end, with a beveled surface 273, these beveled surfaces being more particularly illustrated in Figs. 27 and 28 of the drawings.

Secured to the forward edge of the bed or plate 239 are the angle iron brackets 274, 275 and 276, the upper surfaces of the brackets extending above the upper surface of the table or bed 239, as is more clearly illustrated in Fig. 25 of the drawings, and for a purpose which will be readily apparent. These brackets are secured to the edge of the bed or plate by means of the bolts 277 or other suitable fastenings. Each of the brackets is formed in its upper surface with a longitudinally extending groove or recess 278 and slidably mounted in these recesses and extending parallel with the forward edge of the bed or plate 239 is a bar 279 which is formed at one end with the upwardly extending projection 280 and intermediate the ends with the upwardly extending lugs or projections 281 and 282, as more clearly illustrated in Fig. 26 of the drawings. Adjustably connected to the upper surface of the bar 279 by the bolts 283 are the longitudinally spaced plates 284, 285 and 286 positioned so that one of the plates will cooperate with each of the bars 270 in a manner to be later described. Each of the plates is formed with an elongated opening 287 through which the bolt 283 passes and the elongated openings allow for adjustment of the plates longitudinally of the bar 279. The plate 284 may be adjusted by means of the screw 288 which passes through the lug or projection 280 formed on the end of the bar 279. The plate 285 may be adjusted by means of the screw 289 carried by and extending from one end of the lug or projection 281 and similarly the plate 286 may be adjusted by means of the screw 290 carried by and extending from one end of the lug or projection 282. These adjustment screws and their arrangement relative to their associated plates is more clearly illustrated in Fig. 26 of the drawings. The plates 284, 285 and 286 will extend into the recesses or notches 271 formed in the under surface of the bars 270 and each of the plates is formed on its inner edge with a notch or recess 291 one end of which is beveled as shown at 292. Each of the plates is also provided in its outer edge with a notch or recess 293, one end of which is beveled as shown at 294. The bevels 294 are at the end of the recess opposite to the bevel in the recesses 291. When the bar 279 is slid in a manner to be later described the bevels 292 cooperate with the bevels 272 of the bars 270 and the bevels 294 of the bar 279 cooperate with the bevels 273 of the bars 270 to slide the bars 270 in either a forward or rearward direction depending upon the direction of movement of the bar 279. In other words if the bar 270 is slid towards the right of the position shown in Figs. 26 and 28 of the drawings the beveled surfaces 292 will slide over the beveled surfaces 272 to force the bars 270 inwardly whereas if the bar 279 should be slid to the left of the position shown in the figures above referred to the beveled surfaces 294 would slide over the beveled surfaces 273 and draw the bars 270 outwardly. The movement of the bars 270 will in turn slide the plate 263 towards the plate 260 so that the tape will be clamped between the inner edges of these plates as has been previously described. Secured to the slidable plate 240, adjacent the outer free end thereof, and adjacent the hook member 256, is a bar 295, this bar having an elongated opening 296 formed adjacent its inner end and through which a bolt 297 passes for securing the bar to the plate 240. This bar 295 is formed in one side edge with an elongated recess 298 having one end beveled as shown at 299 and formed in the opposite side edge is an elongated recess 300 having one end beveled as shown at 301. Secured to the bar 279, by means of the bolts 302 and 303, is a member or plate 304, this member or plate having the elongated openings 305 and 306 through which the bolts 303 and 302 pass respectively. By providing these elongated openings 305 and 306 the plate may be adjusted longitudinally of the bar 279 by means of the adjusting screw 307 carried by and extending from one end of each of the lugs or projections 281. The member or plate is formed in its under surface with the transversely extending recess 308 through which extends and is slidable the bar 295. At one end, on one side, the recess is formed with the beveled surface 309 which is adapted to cooperate with the beveled surface 301 of the bar 295, and the opposite side of the recess, at one end, is formed with the beveled surface 310 adapted to cooperate with the beveled surface 299 of the bar 295. The bar 295 is adapted for sliding the bar 279. When the plate 240 is operated, through means of the connecting rod 244 from the crank portion 199 of the crank shaft, the bar 295 will be operated therewith. When the bar 295 is forced outwardly by movement of the plate 240 the beveled surface 301 thereof will engage the beveled surface 309 of the plate 304 and thereby force or slide the bar 279 to the left of the position shown in Figs. 26 and 28 of the drawings. This movement of the bar 279, as previously described, will in turn draw the bars 270 outwardly. When the bar 295 is drawn inwardly by the plate 240 the beveled surface 299 thereof will cooperate with the beveled surface 310 to force the bar 279 to the right and this movement will in turn cause the bars 270, in the manner which has been previously described, to be forced inwardly. The bars 270 and the bar 295 are held in proper position or against upward movement during the sliding thereof by means of the clamping plates 311, 312 and 313 which are secured respectively to the brackets 274, 275 and 276 by means of bolts, screws, or other suitable fastenings.

At this point particular attention might be directed to the movements imparted by the sliding of the plates 240, 241, 242 and 243 to which movement is imparted by the connecting rods 244, 245, 246 and 247 operated by the crank shaft. When the plates 241 and 243 are slid they will in turn slide the plate 248 and its associated blades or knives due to the fact that the plates 241 and 243 are connected to the plate 248 by means of the hook members 252 and 253. As the plates 240 and 242 are slid they will in turn impart movement to the plate 249 and its associated blades or knives due to the fact that the plate 249 is connected to the plates 240 and 242 by means of the hook members 256 and 257. The sliding movement of the plate 240 will in turn impart movement to the bar 295 which operates the bar 279 to in turn operate the bars 270 to slide the plate 263 towards the plate 260 and to clamp the tape therebetween.

Secured to the arm 314, which is connected to one end of the slidable plate 248, as more particularly illustrated in Fig. 26 of the drawings, by means of the bolts 315 or other suitable fastenings, is a cutting member 316 having the knife edge 317 adapted to be engaged with the tape 172 for severing the same into the desired lengths for operation upon by the lath forming mechanism. As the plate 248 is moved forwardly in the manner previously described the cutting edge 317 will be engaged with the tape. The top pate 262 overlies the upper edge of the tape as it is fed into and through the lath forming mechanism and secured to one end of the plate 262, by means of a screw 318 or other suitable fastening is a plate 319, the lower edge of the plate 319 depending below the bottom surface of the plate 272, as shown more particularly in Fig. 6a of the drawings to form an abutment or stop for the end of the tape as it is fed to the lath forming mechanism and during the time that the top and bottom edges of the tape are being turned, by the blades or knives 265, 266, 267 and 268, in a manner which will be presently brought out more in detail. After the edges of the tape have been cut and bent the height of the formed lath will be less than the initial height or width of the tape so that when the lath is being ejected from the forming mechanism it will pass beneath the bottom edge of the plate 319.

As has been previously described the tape 172 is fed to the lath forming mechanism intermittently by means of the feed rolls or discs 213 and 224. When being fed to the forming mechanism the slidable plates 248, 249 and 263 will be in their rearwardmost positions. The tape will be fed at a rapid rate until the end thereof contacts with the stop plate 319 and when thus positioned the feed roll or disc 224 will be swung away from the feed roll or disc 213, in the manner previously described to interrupt the feed. With the tape positioned, as described, the operation of the crank shaft 180 will cause the slidable plate 263 to be moved inwardly or forwardly so that the edge of this plate will engage the side face of the tape and the tape will be clamped between the edges of the plates 260 and 263. Further operation or movement of the crank shaft causes both the plates 248 and 249 to be moved inwardly and to carry therewith the associated knives or blades, the blades 265 and 266 being carried by the plate 248 and the knives or blades 267 and 268 being carried by the plate 249. As has been previously described the blades or knives extend forwardly of the longitudinal inner edges of the plates 248 and 249 and the inward movement of the plates brings the outer ends of the knives or blades into engagement with the tape 172, the blades 266 and 268 engaging the sides of the tape adjacent the lower edge thereof and the blades or knives 265 and 267 engaging the sides of the tape adjacent the upper edge thereof. The knives or blades in each row are spaced apart longitudinally of the plates 248 and 249 so after the blades engage the sides of the tape a further movement thereof will cause the top and bottom edges of the tape to be cut and the edges thereof folded over to extend in a horizontal position. After being folded over as just described the lath, which is indicated at 171, will be formed along one longitudinal edge with the oppositely disposed ears or projections 320 and 321, the projections 320 being longitudinally spaced one relative to the other and the ears or projections 321 being similarly spaced one relative to the other. The opposite longitudinal edge of the lath will be formed with the oppositely extending ears or projections 322 and 323, the ears or projections 322 being longitudinally spaced one relative to the other and the ears or projections 323 being similarly spaced one relative to the other. The formation of the lath 171 is more particularly shown in Figs. 43 to 46 inclusive of the drawings and as shown more particularly in Fig. 44 the ears or projections formed on one longitudinal edge are so positioned relative to the ears or projections formed on the opposite longitudinal edge that a portion of those formed on one edge will be in overlapped relation with those formed on the opposite edge. As shown more particularly in Figs. 45 and 46 when completely formed the lath assume a substantially I-beam construction. As previously described, as the blades or knives are moved towards the tape to turn the edges thereof, the knife edge 317 will engage the tape to sever the same into the desired length. The length of the lath will be substantially equal to or somewhat shorter than the width of the material 7. After the lath has been thus formed the plates 248, 249 and 263 will be moved rearwardly or towards their initial positions. The operating mechanism for the rod 225 will then be so positioned as to operate the rod to return the feed rolls or discs 224 into engagement with the tape and the tape will then be fed forwardly towards the lath forming mechanism. During the time that the feed of the tape has been interrupted a surplus or loop thereof will be formed, as shown at 324 more particularly in Figs. 3, 4 and 6 of the drawings so that as the feeding of the tape is next begun there will be a sufficient surplus to allow a very rapid feed towards the lath forming mechanism. During the feeding of the tape the end thereof adjacent the lath forming mechanism will engage the completed lath and as the tape is rapidly fed it will naturally force the lath from position relative to the lath forming mechanism. After being fed from position relative to the lath forming mechanism the formed lath is directed into and received in the magazine indicated generally at 325, this magazine extending longitudinally of and parallel with the upper corrugating roller 76, as more particularly illustrated in Figs. 15 and 21 of the drawings, and vertically spaced therefrom. The magazine is supported by the arms 326 which are formed with the rearwardly extending ears or projections 327 through which the rod 162 passes, as more clearly illustrated in Fig. 15 of the drawings. The arms 326 are thus pivotally connected to the rod 162 and are adapted for vertical swinging movement. The magazine consists of the longitudinally extending rear plate 328 and the longitudinally extending front plate 329, the rear plate 328 having the longitudinally spaced forwardly extending lugs or projections 330 which engage the rear face of the front plate 329 and thereby space the adjacent faces of the plates, as more particularly illustrated in Fig. 15 of the drawings, and form a guideway for the plunger bar 331 beneath which the formed lath is received. The front plate 329 is connected to the rear plate 328 by means of the screws or bolts 332 or other similar fastenings, the lugs or screws preferably extending into threaded recesses formed in the lugs or projections 330. The lath is normally supported in the magazine by the hinged doors 333 which are normally held in their raised positions by means of the springs 334, as more particularly illustrated in Figs. 22 and 23 of the drawings. The laths are adapted to be ejected from the magazine and received in the channels 108 formed in the plates 107 of the outer surface of the upper corrugating roll 76. The plunger 331, as previously stated, is slidable in the magazine over the lath and when the plunger is lowered it will engage the upper surface of the lath and force the lath downwardly so that under the pressure the hinged doors 333 will swing downwardly against the action of the springs 334 and allow the lath to drop from the magazine into the channel. For operating the plunger 331

I provide the arms 335 which at one end are connected to the oscillatory shaft 336 carried by and mounted in the magazine supporting arms 326. The outer or free ends of the arms 335 are forked as shown at 337, more particularly in Fig. 24 of the drawings, and extending through the forked ends of the arms 335 are the posts or rods 338 which extend upwardly from the plunger 331. Carried by these posts or rods 338 are the enlargements 339 and 340 which engage opposite faces of the arms 335 adjacent the outer ends thereof, and at 341 I have illustrated a nut by which the uppermost enlargement 340 may be adjusted. For operating the oscillatory rod 336 an arm 342 is secured to the rod adjacent one end thereof and carried by this arm, on an axis extending from one face thereof, is a roller 343 which engages with the periphery of a disc 344 having the notches or recesses 345 formed therein. The disc 344 is carried by the shaft 78 upon which the upper corrugating roller 76 is mounted and preferably is positioned beyond the outer face of the gear wheel 79, as more particularly illustrated in Figs. 2, 6 and 24 of the drawings. The arm 342 is normally held downwardly so that the roller 343 engages with the peripheral edge of the disc by means of the coiled spring 346, the upper end of the coiled spring being connected to a wire or rod 347 which in turn is secured to the arm 342 by means of the bracket 348. The lower end of the coiled spring is connected to a lever 349 which is pivotally connected at 350 to the framework of the machine as more particularly illustrated in Fig. 2 of the drawings and this lever is normally held in its lowermost position by a plate or stop member 351 which is secured to the frame and engages over the upper edge of the lever, as shown more particularly in Fig. 2. When it is desired to release the tension of the spring 346 to raise the arm 342 for any desired purpose the outer free end of the lever 349 may be lowered to disengage the lever from the plate or stop 351. It can also be seen that this lever can be used, when desired, for adjusting the tension of the spring 346. As the disc 344 rotates it will bring the notches 345 in position beneath the roller 343 and then the roller will drop into the recess due to the action of the spring 346, so that the arm 342 will naturally be lowered to rock or rotate the rod 336 and lower the outer free ends of the arms 335. The movement of the arms 335 lower the plunger 331 to eject the formed lath from the spring controlled hinged doors and allow the lath to be received in the channel 108 of the corrugating roll.

It will be appreciated that as the formed lath is positioned in the magazine a stop of some character will be advisable to properly position the lath to prevent the same from extending beyond the outer end of the magazine, and whereby it may be released to prevent undue friction as the lath is being ejected from the magazine to the channel in the corrugating roll. For this purpose I have provided the depending finger 352 which is pivotally connected at 353 to the bracket 354. This finger overlies the opening in the end of the magazine and the end of the formed lath will engage the inner face of this finger as shown more particularly in Figs. 6 and 24 of the drawings. For normally holding the finger in its lowermost position, in engagement with the end of the lath, I provide the lever 355 which is pivotally connected at 356 to the bracket 354. The inner end of this lever engages the outer face of the finger as shown more particularly in Fig. 24 of the drawings and pivotally connected to the outer end of the lever is one end of a link 357, the opposite end of the link being connected at 358 to the arm 359 secured to the rod 336 adjacent the arm 342. A roller 360 is carried by the arm 359 and normally engages the outer periphery of the disc 344 having the notches 345. As the disc 344 is rotated the notches will be successively positioned beneath the roller 360 and when so positioned the roller will drop into the notches to allow the arm 359 to drop thereby operating the lever 355 through means of the link connection 357 to raise the inner free end of the lever so as to position the same and allow the lower end of the finger 352 to swing outwardly and disengage the finger from the end of the lath. This movement will occur as the lath is being ejected from the magazine and the finger being released from the end of the lath will prevent undue friction thereon and allow the lath to drop from the magazine without undue friction.

From the previous description and by reference more particularly to Fig. 15 of the drawings it will be understood that when the formed laths are received in the channels 108 of the upper corrugating roll 76 that they will be positioned over the strands of wire 154 which have been fed to extend into the circumferentially extending grooves 118 formed in the outer surface of the corrugating roll 76. The formed laths are adapted to be carried around with the corrugating roll 76 and will be deposited into the grooves or channels 361 formed in the strip of material 7 by the corrugating rolls 76 and 77 as shown more particularly in Figs. 15 and 45 of the drawings. Preferably a lath will be positioned in every other groove or channel or in other words there will be a groove or channel between those grooves or channels in which the laths are deposited. As shown more particularly in Fig. 15 of the drawings after the laths have been deposited into the grooves or channels 361 the wires 354 will extend longitudinally of the strip of material 7 and over the upper surfaces of laths. The strands of wire 154 will extend along the strip of material adjacent the loops 75 formed in the wire strands 71, it being understood that these loops extend through the material and are adapted to be bent around the strands 154 by operation of the bars 119 and 120 more clearly illustrated in Figs. 18, 19 and 20 of the drawings. As shown more particularly in Figs. 43, 44 and 45 of the drawings the loops 75 extend through the material at the high points between the grooves or channels 361 and said loops 75 are adapted to be bent around the wires 154 at a point just beyond the position where the laths are deposited into the grooves or channels of the material. This point is shown more particularly at $a$ in Fig. 15 of the drawings. The bars 119 and 120 are initially in the position shown more particularly in Fig. 18 of the drawings and the loops 75 will extend vertically along side of the wire strands 154. The initial sliding movement of the bars 119 and 120, through means of the mechanism previously described, will carry the bars towards the right of Fig. 18 so that the hooked portions 125 will engage beneath the strand 154. The movement of the bars will also cause the beveled edge 131 of the member 130 to engage the side of the loop 75 and to bend the same over the strand 154 as shown more particularly in Fig. 19 of the drawings with the horizontal wall 136 of the recess 134 extending over the bent horizontal portion of the loop and the vertical wall of the recess engaging the side face of the loop and holding the same into tight engagement with the strand 154. When this position is reached the bar 119 will be held stationary while the bar 120 is given a further sliding movement. This sliding movement of the bar 120 will cause the members 130 to be rotated around the rods 132 and the pointed or beveled surface 131 engaging the top of the horizontal portion of the loop will cause the loop to be bent or curved around the strand 154 into the position illustrated more particularly in Fig. 20 of the drawings. With this looping or bending having taken place the rods are slid in a reverse direction with their associated parts. With the loops curved or bent around the strands 154 it will be seen that both the wire strands 71 and 154 are securely connected to the strip of material and that the strands 154 overlie the formed laths positioned in the grooves or channels of the material and securely hold them in position against accidental displacement.

It will be appreciated that some means should be provided for preventing the laths from dropping from the channels as the roll 76 is rotated and to accomplish this I provide the mechanism to be now described. Carried by the horizontally extending rods 352 and 363, which are supported by the framework of the machine, are the arcuate-shaped guide members 364 the inner surfaces of which are formed on an arc conforming to the curvature of the roll 76. I preferably provide three of these guide members 364 which are longitudinally spaced relative to the roll, as more particularly illustrated in Fig. 4 of the drawings. The lower ends of these guide members, as shown more particularly in Fig. 15 of the drawings, extend for a distance under the roll 76 or in a position to prevent the laths from falling from the channels in which they are received until ready to be deposited into the grooves or channels of the material. Pivotally connected at 365 to the upper ends of the guide members 364 are the arms 366, the inner faces of which are curved to conform to the curvature of the roll. These arms, as shown more particularly in Fig. 15 of the drawings, extend over the upper portion of the roll with their upper free ends positioned adjacent the magazine from which the formed laths are discharged. As the roll 76, with the laths thereon, is rotated the laths will be carried under the arms 366 and then around the inner faces of the guides until in a position to be deposited into the grooves or channels of the material. The arms 366 are connected, adjacent their upper ends, by means of the transversely extending bar 367 secured to the arms by means of the screws or bolts 368 or other suitable fastenings. The arms 366 are held in position in engagement with the roll due to their own weight but may be swung outwardly from the roll when desired.

It is desirable to cut the material, after the laths have been secured thereto, into suitable lengths and for this purpose I provide the mechanism to be now described. At 369 and 370, more particularly in Fig. 33 of the drawings, I have illustrated upwardly extending members formed on or secured to the machine to which are secured, by means of the bolts 371 or other suitable fastenings, a cross beam or cross head 372. Secured to this beam or cross head, by means of the clamps 373, are the longitudinally spaced knives or chisels 374 which are vertically adjustable by means of the screws 375, the screws being operable through threaded openings formed in the flange 376 formed on one face of the beam or cross head and extending longitudinally thereof. As shown more particularly in Fig. 33 of the drawings the cutting edges of the knives or chisels 374 extend slightly above the upper edge of the beam or cross head 372. Slidably mounted in guideways formed in the members 369 and 370 is a beam or cross head 377, this beam or cross head being operable above and extending parallel with the beam or cross head 372. The beam or cross head 377 is provided, adjacent its lower longitudinal edge, with the horizontally extending flange 378, which extends in a direction away from the cross head or beam 372 and in position to overlie the material or plaster base as it is fed from the machine between the two beams or cross heads, as is shown more particularly in Fig. 5 of the drawings. Extending from the opposite face of the cross head or beam 377 and spaced intermediate the top and bottom edges thereof, is a flange or ledge 379 which is formed with longitudinally spaced threaded openings through which adjusting screws 380 are adapted to pass and be operable. Secured to the inner face of the beam or cross head 377, adjacent the lower edge thereof, by means of the screws 381, or other suitable fastenings, are the blade sections 382 having serrated bottom edges, as shown at 383. The ends of adjacent blade sections are spaced apart sufficiently to receive therebetween the knives or chisels 384 which are adapted to be adjusted vertically by means of the adjusting screws 380. These knives or chisels are secured to the beam or cross head 377 by means of the plates 385 which are secured in position by means of the screws or other suitable fastenings 386, these screws or fastenings passing through openings formed in the saw blade sections and into openings formed in the beam or cross head. It will be understood that the knives or chisels 384 are of slightly greater thickness than the blade sections 382 so that the clamping plates will securely hold the same in position. The cutting edges of the knives or blades will extend below the teeth formed in the blade sections 383 and the blades or chisels 373, carried by the lower cross head or beam will be positioned relative to the knives or chisels carried by the upper cross head or beam as shown more particularly in Fig. 5 of the drawings. As previously stated, the plaster base is passed between the cross heads or beams and when the upper cross head is lowered, in a manner to be later described, the knives or chisels will cut through the longitudinally extending wires forming a part of the base whereas the teeth of the blade sections will cut through the material forming the body portion of the base to thereby sever the same into the desired lengths. Extending inwardly from the bottom cross head or beam 372, in a direction towards the transverse center of the machine, is a flange 387 which forms a support for one end of a platform 388 over which the plaster base is adapted to pass as shown more particularly in Fig. 5 of the drawings.

Formed adjacent each end of the upper cross head or beam 377 is a pair of lugs 389, each of the lugs having a vertically extending opening through which the end of a rod 390 passes and is secured in position by means of the nuts 391. As shown more particularly in Fig. 5 of the drawings there will be a pair of these rods 390 adjacent each end of the cross beam and secured to the lower ends of each pair is a bearing 392 having an opening in which is adapted to operate an eccentric 393 secured on and carried by the horizontal shaft 394 which extends parallel with and beneath the lower cross head or beam 372 as shown more particularly in Fig. 33 of the drawings. As shown also in this figure the eccentrics will be longitudinally spaced and when the shaft 394 is rotated the eccentrics will cause the rods 390 to be moved vertically and thus raise and lower the upper cross head or beam 377 to effect the cutting of the material or plaster base as has been previously described. One end of the shaft 394 extends somewhat beyond the outer face of the vertically extending member 369 and is supported in the bracket shown at 395. Freely mounted on the extended end of the shaft 394 is a gear wheel 396 which is constantly rotated through means of the gear or pinion 397 carried by the main drive shaft 102, as shown more particularly in Fig. 2 of the drawings. As stated, the gear wheel 396 is free upon the shaft 394 so that normally the rotation of the gear has no effect on the shaft 394 and thus the upper cross head or beam 377 is normally held against operation. Secured to the end of the shaft 80, as more particularly illustrated in Fig. 2 of the drawings, is an arm 398 which will rotate with the shaft 80 and is of such a length, when in proper position, to engage the upper end of the lever 399 which at its lower end is loosely mounted upon the horizontal shaft 400 extending from the side of the machine as shown more particularly in Figs. 2 and 6 of the drawings. This lever 399 has pivotally connected thereto a pawl 401 which is adapted to engage the teeth of a ratchet wheel 402. One of the teeth of the ratchet wheel, shown at 403, is of greater depth than the remaining teeth so that when the pawl 401 engages this tooth, of greater depth, the pawl will drop a greater distance and engage the inwardly extending pin or projection 404 carried by the arm 405 which is supported upon the shaft 400 for swinging movement. Secured to the shaft 400, by means of the bolt 406 or other suitable fastening is the depending arm 407 from one face of which extends the projection 408 adapted to form a stop for the counterweight 409 on the lower end of the lever 399, as shown more particularly in Figs. 37 and 38 of the drawings. The depending arm 404 has a substantially U-shaped extension 410 between the arms of which operates the lower edge of the ratchet wheel 402. The arm 407 is also formed with the opening or recess 411 in which is received a coiled spring 412 which normally forces outwardly the plunger 413, the outer end of the plunger engaging the inner face of the ratchet wheel 402 and holding the ratchet wheel against accidental movement or in position until positively operated through the swinging of the lever 399 and associated pawl.

A substantially horizontally extending bar 414 has one end pivotally connected at 415 to the upper end of the arm 405 and pivotally connected to the opposite end of the bar 414 is a latch member 416 to which is connected one end of a coiled spring 417, the opposite end of the coiled spring being connected to a lug or projection 418 formed on the bar, as more particularly illustrated in Fig. 35 of the drawings. The bar 414 is provided with an elongated opening 419, adjacent that end to which the latch member 416 is connected, and extending through this elongated opening is a pin 420 which extends inwardly from the substantially horizontal portion 421 of the bracket 395. In the arm portion 421 is also formed a recess 422 in which is slidably mounted the bolt 423, the inner end of which is formed with the beveled portion 424 for a purpose to be later described. The coiled spring 425 is connected at one end to a projection 426 formed in the recess 422 and at the opposite end is connected to a projection 427 formed on the face of the bolt 423. This coiled spring normally tends, as will be appreciated, to draw the bolt 423 inwardly of the recess. Keyed to the extension of the gear shaft 394, adjacent the outer face of the gear 396, as shown more particularly in Fig. 34 of the drawings, is a collar 428 which has a horizontally extending opening therein to receive the slidable pin 429. At the outer end the pin is provided with an enlarged head 430 having the inner face beveled to cooperate with the bevel 424 of the bolt 423. Secured to the outer face of the collar 428 is a leaf spring 431 adapted to normally urge the pin 429 towards the inner face of the collar and in a position adapted to be engaged by a projection 432 formed on the outer face of the gear wheel 396. Normally the pin 429 is held retracted against the action of the spring by the beveled surface 424 of the bolt 423 engaging the beveled surface of the enlarged head 430 of the pin as shown more particularly in Fig. 34 of the drawings. Extending outwardly from the outer face of the slidable bolt 423 is a projection 433 adapted to be engaged by the latch member 416 as shown more particularly in Fig. 35 of the drawings.

As previously stated the shaft 394 is normally held against rotation and the gear wheel 396 is rotated freely thereon. Upon each rotation of the arm 398, carried by the shaft 80, it will engage the upper end of the lever 399 and swing the same sufficiently so that the pawl 401 will carry the ratchet wheel 402 around the distance of one tooth. Upon the complete revolution of the ratchet wheel the end of the pawl 401 will drop into the deeper recess or notch forming one tooth and will drop sufficiently so that upon the next step movement of the ratchet wheel the end of the pawl will engage the projection 404, carried by the arm 405, and swing such arm forwardly. As the arm is swung forwardly it will draw on the bar 414 and as the hooked end of the latch member 416 is engaged with the projection 433 it will slide the bolt 423 outwardly against the action of the coiled spring 425 and will release the inner end of the bolt from engagement with the enlarged head 430 of the pin 429. When the pin is thus released the leaf spring 431 will force the same inwardly so that the inner end of the pin 429 will be in position to be engaged by the projection 432 formed on the gear wheel 396. As the gear wheel is rotated the projection 432 will engage the pin 429 and rotate the collar 428 a complete revolution and as the collar is keyed to the shaft 394 it will naturally rotate the shaft. The rotation of the shaft, through means of the eccentrics 393, raises and lowers the bars 390 and these in turn raise and lower the upper beam or cross head 377. As the beam or cross head is lowered it will cut the material or plaster base, as has been previously described, the knives or chisels cutting the longitudinally extending wires forming a part of the plaster base and the teeth of the saw blades will sever the material, forming the body of the base, transversely. After the collar 428 has made a complete revolution, the bolt 423 having returned to its normal position, the beveled surface of the enlarged head 430, of the pin 429, will ride over the beveled surface 424 of the bolt 423, and the pin will be drawn rearwardly against the action of the leaf spring 431 into its normal position. Thus the gear wheel 396 may be again freely rotated, without effecting the cross head or pin carrying the cutting members. From the above it will be seen that the cutting means is operated periodically and the plaster base or material is cut at the desired time to provide the desired lengths.

After having passed through the cutters the material or plaster base is adapted to be conveyed from the machine and fed to suitable mechanism for winding the same into roll form. From the cutting mechanism the plaster base or material is fed over the transversely spaced bars 434 pivotally connected at 435 to the machine frame adjacent the cutters. These bars 434 are preferably downwardly inclined, as shown more particularly in Fig. 1 of the drawings, and at their lower ends are pivotally connected to a pair of transversely spaced bars 436, the bars 436 preferably extending upwardly from the point where they are connected to the bars 434 with their outer ends connected to the standards 437. I preferably downwardly incline the bars 434 to aid in carrying the material or plaster base away from the cutting mechanism but it will be understood that I do not limit myself to this particular arrangement for, in actual practice, I find that the material or base may be readily moved away from the machine even though the bars 434 and 436 are in a substantially horizonal plane. Pivotally connected at 438 to the standards 437 is a platform 439, the weight of the platform preferably being sufficient that the free end thereof will normally swing downwardly against the action of the weighted arm 440. Positioned adjacent the free outer end of the platform 439 is a base 441 having the upwardly extending standard or pedestal 442 which rotatably supports the horizontally extending sleeve 443 having the longitudinally extending opening 444 formed therein. Rotatably mounted in the sleeve, and extending longitudinally thereof, is the drum 445 having the longitudinally extending recess 446 adapted to be brought into registration or alignment with the opening 444 formed in the sleeve 443. A hand wheel 447 is secured to one end of the sleeve 443 for rotating the same when desired. Extending outwardly from one end of the drum 445 is a shaft 448 which is rotatably supported in the transversely spaced standards 449. A gear wheel 450 is secured to the shaft 448 and meshes with a gear or pinion 451 carried by the horizontal shaft 452 rotatably mounted in the standards 449 below the shaft 448. At 453 I have indicated generally a clutch member which is adapted to be engaged with the pulley 454 loosely mounted upon the shaft 452 and driven through means of the belt 455 which in turn is driven from the pulley 456 carried by the shaft 92. When the clutch member 453 is operated the pulley 454 will be coupled to the shaft 452 and through means of the pinion 451 and gear 450 rotate the shaft 448. The clutch member 453 is operated through means of the hand lever 457 which is carried by the vertically extending shaft 458. Arms 459 are carried by the shaft 458 and are pivotally connected at 460 to the clutch member. When the material is to be connected to the winding drum and sleeve the platform 439 is raised to be on a substantial level with the opening 444 formed in the sleeve 443 and is held in this raised position by means of the slidable member 461 which engages beneath the edge of the platform. This slidable member is carried by the block or casting 462 and is operated by means of the hand lever 463 pivotally connected at 464. The platform will thus be in a position to guide the end of the material through the opening 444 of the sleeve 443 and the drum 445 will be rotated so as to bring the recess 446 in alignment with the opening 444 so that the end of the base or material will pass into the recess. After the end of the base or material has passed into the recess 446 the clutch member 443 will be engaged with the pulley 454 and the drum 445 will be rotated from the shaft 448. The rotation of the drum relative to the sleeve will carry the recess 446 in a position relative to the opening 444 as shown more particularly in Fig. 40 of the drawings and the material will thus be clamped in such a manner that the sleeve 443 will be rotated with the drum and the material will be wrapped upon the sleeve into roll form. When one length of the material has been rolled upon the sleeve it may be removed for shipment.

The operation of the machine is controlled through means of the clutch member indicated generally at 465 which is mounted on the main drive shaft 102. The clutch member is operated from the vertically extending shaft 466 to which is connected, preferably adjacent the lower end, the arm 467. Pivotally connected at 468 to the arm 467 is a bar 469 which extends towards the front end of the machine as shown more particularly in Fig. 5 of the drawings. The forward end of the bar 469 is pivotally connected at 470 to an arm 471 which is secured to a shaft 472 extending transversely of the machine. Secured to the shaft 472 and positioned at convenient points are a multiplicity of hand levers 473. These hand levers are so positioned to be in easy reach of the operator so that he may control the clutch, and through the clutch the machine, when standing at different points of the machine.

From the above detail description it will be seen that I have provided a novel form of machine for making plaster base or plaster support in which a strip of material is corrugated, in which metal laths are formed and deposited in certain of the grooves of the corrugated material, in which the laths are secured to the strip of corrugated material, within certain of the corrugations, in which the strip of material with the laths secured thereto is cut into suitable lengths, and in which the material is fed to certain mechanism which will wind the same into the roll form ready for shipment. The completed base or support is shown more particularly in Figs. 43, 44 and 45 of the drawings. I wish to lay particular stress upon the fact that the machine takes a suitable strip of material, such as paper, and corrugates the same, that laths are automatically formed by the machine from a strip of tape fed thereto, and that strands of wire fed to the machine are manipulated in such a manner and so formed that they will reinforce the paper or similar material and at the same time connect the laths thereto. As has been previously described the paper or similar material, to form the body portion of the base or support, is received in roll form and supported upon the base or support, from which it is drawn by means of the feed rolls 11 and 12 and is then directed over the horizontally supported rolls 21 and 22 and then over the platform 26, as shown more particularly in Figs. 1 and 7 of the drawings. From the platform 26 the material is drawn between the discs 46 and 47 of what may be termed the loop forming mechanism. In other words the strands of wire 71 are fed beneath the strip of paper or similar material and then at certain points and by certain mechanism portions of the strands are forced through the paper or similar material to form loops. This loop forming mechanism is more particularly illustrated in Figs. 11, 12, 13 and 14 of the drawings. The upper discs 46 are provided with the notches or recesses 47 which receive the loops formed by the mechanism carried by the lower discs 43. As has been set forth in the detailed description the lower discs are provided with the circumferentially extending grooves 53 into which the strands of wire 71 are fed and these lower discs are also provided with the longitudinally extending rods 51 which at one end have the crank members 52 secured thereto with the outer ends of the crank portions received in a cam groove 49 formed in the inner face of the plate 48 as shown more particularly in Figs. 11 and 13 of the drawings. Slidable members or plates 56 are received in recesses formed in the lower discs 43 and each of these slidable members carries a blade or knife 57 as shown more particularly in Fig. 12 of the drawings. The slidable members, with their associated blades or knives, are adapted to be operated by the longitudinally extending rods 51, the rods, in turn, being adapted to be rocked due to the ends of the crank members 52 being received and operable in the groove 49. Normally the rods are positioned to hold the slidable members and their associated blades or knives rearwardly in the recess but at a predetermined point the rods are rocked so as to project one of the slidable members with its associated blade or knife so that the knife or blade will engage the strand of wire 71 and force the same through the strip of paper or similar material 7 and form a loop which extends into the notch or recess 47 formed in the upper disc or plate 46 in the manner shown more particularly in Fig. 12 of the drawings. After the loop has been formed the continued rotation of the lower disc or plate 43 will cause the rod to be rocked to again withdraw the slidable member and its associated blade to its innermost position and to release the blade or knife from the loop. Thus a plurality of longitudinally spaced loops are formed in each of the strands 71 and project through the paper or similar material to be later bent to secure other strands of wire to the upper surface of the material. The clamping members 62 are provided for the purpose which has been previously set forth to clamp the strands of wire 71 at predetermined points to prevent the formed loops from being distorted during the feeding of the strands and material through the machine. After passing from the loop forming mechanism, just described, the material is directed between the corrugating rollers 76 and 77, as more particularly illustrated in Figs. 5 and 15 of the drawings. These corrugating rolls or rollers form the transversely extending corrugations in the material 7 with the loops 75 extending through the ridges between the corrugations. The upper corrugating rolls 76 are formed with the longitudinally extending recesses 108 into which the formed laths are deposited from the magazine 328 and prior to the time at which the laths are deposited into the recesses the wire strands 154 have been fed over the top of the upper corrugating roll 76 and received in circumferentially extending grooves 118 formed therein. The formed lath when deposited into the recess 108 overlies the wire strands, as more particularly illustrated in Fig. 15 of the drawings, and as the corrugating roll 76 is rotated the formed lath will be carried therewith beneath the guide arms 364 and 366 until the lath is in position to be dropped into one of the corrugations formed in the material 7 at the position shown more particularly in Fig. 15 of the drawings. After the lath has been deposited into the corrugation of the material the wire strands 154 will be positioned over the upper surface of the lath and will extend longitudinally of the material with each strand in close proximity to the loops 75 formed in the wire strands 71. As has been previously described the upper corrugating roll 76 carries mechanism for bending the loops 75 around the strands 154 to secure said strands 154 to the material 7. The mechanism for bending the loops 75 around the strands 154 includes the slidable bars 119 and 120, and associated members, more particularly illustrated in Figs. 18, 19 and 20 and as I have previously given a detailed description of the operation of these members, in bending the loops, a further description thereof is not thought necessary at the present time. Suffice to say that the bars 119 and 120 are operated through the slidable bars 138 and 139, which are controlled through means of the swinging arms 142 and 143 which carry the rollers 144 and 145 operable in the cam grooves 146 and 148 formed in the member 147. After the loops 75 have been bent around the strands 154 the strands 71 and 154 will be securely connected to the strip of material 7 and the strands 154 will overlie the laths 171 and hold the laths in their respective grooves and against movement relative to the material. As will be readily understood the strands of wire 71 extend longitudinally beneath the material 7 and are transversely spaced relative thereto and the strands of wire 154 extend longitudinally over the upper surface of the material and are transversely spaced relative thereto, the strands 154 extending parallel with the strands 71. Not only do these strands of wire act to secure the laths to the material but they also act to reinforce the material and aid in supporting the plaster which is passed over the material. After the laths have been secured in position as just described the base or support has been completed but it is desirable for shipping and handling to have the material cut into desired lengths and this is accomplished by means of the cutting mechanism more particularly illustrated in Figs. 33, 33a, and 33b. The blades 382 having the serrated cutting edge are adapted for cutting through the material 7 transversely and the knives or chisels 374 and 384 are positioned so that they will cut the longitudinally extending strands of wire. The cutting mechanism is operated in the manner which has been previously set forth in detail and further explanation thereof is not thought necessary at the present time. From the cutting mechanism the material is fed over the bars 434 and 436 to the platform 439 and the end of the material is connected to the drum 445, which is provided with the recess 446 for receiving the end of the material. When the drum is then rotated in the manner previously described, relative to the sleeve 443, it will clamp the material in the opening 444 of the sleeve and the sleeve will rotate with the drum to wind the material thereon. When the desired length of material has been wound upon the sleeve and drum it may be removed for storing or shipping.

The manner in which the lath is formed has been previously described in detail. However, I wish to lay particular emphasis on the fact that the lath is completely formed from a strip of tape which is intermittently fed to the forming mechanism. The tape is fed edgewise to the forming mechanism and while the forming mechanism is in operation the feed of the tape is discontinued. After the forming operation the feed is again set into operation and as this will be exceedingly rapid it will discharge the formed lath from the forming mechanism and deposit the same into the magazine 328 from which it is discharged by the plunger 331 to be received in the recess 108 of the upper corrugating roll 76. Before being discharged from the magazine the lath will be supported by the hinged doors or plates 333 but these plates are opened downwardly as the lath is ejected by the plunger. The movement of the lath relative to the magazine is limited by the depending finger 352 which will be normally held in contact with the end of the lath by means of the lever 355 as shown more particularly in Fig. 24 of the drawings. When the lath is to be ejected from the magazine it will be desired to release the finger 352 from the end of the lath to reduce friction during the ejecting operation. To accomplish this the lever 355 will be operated in the manner previously set forth to allow the finger 352 to swing outwardly and thereby release the end of the lath. It will be understood that the formed lath is of substantially I-beam construction in that oppositely extending flanges are formed on both the top and bottom edge thereof. The specific formation of the lath is shown more particularly in Figs. 43, 44, 45 and 46 of the drawings. The strands 154 are fed from the spools or reels 153 by means of the knurled rolls 158 and 159 as shown more particularly in Fig. 5 of the drawings. The upper set of rollers are mounted for swinging movement and may be all raised and lowered simultaneously or each roller may be individually raised and lowered. The rolls are carried by the arms or levers 161 which have portions thereof normally resting upon the upper flat surface of the rod 163. When the rod 163 is rotated by the operator grasping the handhold or lever 165 all of the arms 161 will be raised simultaneously with the rollers 159 carried thereby. To each of the arms 161 is pivotally connected a cam lever 166, one end of which engages the flat surface of the rod 163. When it is desired to raise or lower one of the arms 161 independently of the others the cam lever, connected to that particular arm, is operated and as the end thereof engages the flat surface of the rod 163 it will raise or lower the arm and its associated roller. The several elements of the machine are operated from a single drive motor and the clutch mechanism is controlled from levers or the like arranged in easy reach of the operator or operators. A separate clutch is shown at 453 for controlling the mechanism used for winding the material into roll form. A lever will be provided for operating this last mentioned clutch, the lever extending into position to be grasped by an operator who will be positioned adjacent the winding mechanism.

It will be understood that the laths 171 which extend transversely of the material, as well as the wire strands 71 and 154 which extend longitudinally thereof, will act to reinforce the material. In use the plaster base or support is secured to a suitable supporting structure such as the rafters, beams, etc., and the plaster is spread over the face thereof. The plaster will naturally enter the corrugations formed in the material and will be supported by the laths 171 as well as the wire strands 154 extending over the tops of the laths. The plaster will flow around the laths and the projections on the edges of the laths will act as keys and be embedded within the mass of plaster. In use I have found my improved form of plaster support or base to be of considerable advantage in taking the place of the ordinary form of lathing now in use, such as wooden laths and the like. The improved form of plaster base or support is equally as well adapted for application vertically to walls or the like or horizontally to ceilings or the like. The rolled material may be removed from the sleeve 443 by forcing the same longitudinally thereof and off of the free end or to the left of the position shown in Fig. 41.

Having fully described my invention what I claim as new and desire to secure by Letters Patent is:

1. A machine of the character described including means for feeding a strip of material, means for positioning a reinforcing element relative to the material, a rotatable member, and means carried by said rotatable member for displacing portions of the reinforcing element and forcing the same through the material.

2. A machine of the character described including means for feeding a strip of material, means for positioning a reinforcing element relative to the material, a rotatable member, and reciprocable means carried by the rotatable member for displacing portions of the reinforcing element and forcing the same through the material.

3. A machine of the character described including means for feeding a strip of material, means for positioning a reinforcing element relative to the material, rotatable members between which the material and reinforcing element is passed, and means associated with the rotatable members for displacing portions of the reinforcing element and forcing the same through the material.

4. A machine of the character described including means for feeding a strip of material, means for positioning a reinforcing element relative to the material, rotatable members between which the material and reinforcing element pass, and means carried by one of said rotatable members for displacing portions of the reinforcing element and forcing the same through the material.

5. A machine of the character described including means for feeding a strip of material, means for positioning a reinforcing element relative to the material, rotatable members between which the material and reinforcing element pass, and reciprocable means carried by one of said rotatable members for displacing portions of the reinforcing element and forcing the same through the material.

6. A machine of the character described including means for feeding a strip of material, means for positioning a reinforcing element relative to the material, rotatable members between which the material and reinforcing element pass, one of said members being provided with circumferentially spaced recesses, and means carried by the other member for displacing portions of the reinforcing element and forcing the same through the material into one of the recesses of the other member.

7. A machine of the character described including means for feeding a strip of material, means for positioning a reinforcing element relative to the material, a rotatable member, a rocking element carried by the rotatable member, and means operable by the rocking element for displacing portions of the reinforcing element and forcing the same through the material.

8. A machine of the character described including means for feeding a strip of material, means for positioning a reinforcing element relative to the material, a rotatable member, a rocking element carried by the rotatable member, and reciprocable members operable by the rocking element for displacing portions of the reinforcing element and forcing the same through the material.

9. A machine of the character described including means for feeding a strip of material, means for positioning a reinforcing element relative to the material, a rotatable member, a rocking element carried by the rotatable element and having an offset portion, means engageable with the offset portion for operating the rocking element, and a reciprocable member operable by the rocking element for displacing portions of the reinforcing element and forcing the same thorugh the material.

10. A machine of the character described including means for feeding a strip of material, means for positioning a reinforcing element relative to the material, a rotatable member, a plurality of members carried by the rotatable member for displacing portions of the reinforcing element and forcing the same through the material, and means for successively operating the members carried by the rotatable member.

11. A machine of the character described including means for feeding a strip of material, means for positioning a reinforcing element relative to the material, a rotatable member having circumferentially spaced recesses therein, a reciprocable member operable in each of the recesses, and means for successively operating the reciprocable members for displacing portions of the reinforcing element and forcing the same through the material.

12. A machine of the character described including means for feeding a strip of material, means for positioning a reinforcing element relative to the material, a rotatable member having circumferentially spaced recesses formed therein, a reciprocable member received in each of the recesses, and means including rocking elements for successively operating the reciprocable members for displacing portions of the reinforcing element and forcing the same through the material.

13. A machine of the character described including means for feeding a strip of material, means for positioning a reinforcing element relative to the material, a rotatable member having circumferentially spaced recesses, a reciprocable member received in each of the recesses, and means for successively operating the reciprocable members for displacing portions of the reinforcing element and forcing the same through the material, said last mentioned means including a rocking element positioned adjacent each of the reciprocable members, an offset portion on each of the rocking elements, and means engageable with said offset portions for successively operating the rocking elements.

14. A machine of the character described including means for feeding a strip of material, rolls between which the material is fed for forming corrugations therein, means for positioning a reinforcing element relative to the material, and means for connecting the reinforcing element to the material.

15. A machine of the character described including means for feeding a strip of material, corrugating rolls between which the material is passed for forming corrugations therein, means including one of the corrugating rolls for positioning reinforcing elements in certain of the corrugations of the material, and means for securing said reinforcing elements in said corrugations.

16. A machine of the character described including means for feeding a strip of material, means for corrugating the material, means for positioning reinforcing elements in certain of the corrugations, means for positioning other reinforcing elements relative to the material and at right angles to the first mentioned reinforcing elements and engageable therewith, and means for connecting the last mentioned reinforcing elements to the material.

17. A machine of the character described including means for feeding a strip of material, a rotatable member for positioning a reinforcing element on the material, and means for delivering the reinforcing element to the rotatable member.

18. A machine of the character described including means for feeding a strip of material, a rotatable member for positioning a reinforcing element on the material, and means for forming and delivering the reinforcing element to the rotatable member.

19. A machine of the character described including means for feeding a strip of material, a rotatable member having a recess therein and adapted for positioning a reinforcing element on the material, and means for delivering a reinforcing element into the recess of the rotatable member.

20. A machine of the character described including means for feeding a strip of material, a rotatable member having circumferentially spaced recesses therein and adapted for delivering reinforcing elements on the material in longitudinally spaced relation, and means for delivering the reinforcing elements to the recesses of the rotatable member.

21. A machine of the character described including means for feeding a strip of material, a rotatable member having circumferentially spaced recesses therein and adapted for positioning reinforcing elements upon the material in longitudinally spaced relation, means for forming the reinforcing elements, and means for delivering the reinforcing elements to the successive recesses of the rotatable member.

22. A machine of the character described including means for feeding a strip of material, means for corrugating the material, said corrugating means including a rotatable member, and means for delivering reinforcing elements onto the rotatable member, said rotatable member depositing the reinforcing elements into corrugations of the material.

23. A machine of the character described including means for feeding a strip of material, means for corrugating the material, said corrugating means including a rotatable member, means for forming reinforcing elements, and means for delivering the formed reinforcing elements to the rotatable member, the rotatable member in turn depositing the reinforcing elements into corrugations of the material.

24. A machine of the character described including means for feeding a strip of material, means for corrugating the material, said corrugating means including a roller having circumferentially spaced recesses therein, and means for delivering reinforcing elements into the successive recesses of the rotatable member, the rotatable member, in turn, delivering the reinforcing elements from the recesses thereof into corrugations of the material.

25. A machine of the character described including means for delivering a strip of material, a rotatable member adapted for delivering reinforcing elements to the material, means for depositing the reinforcing elements upon the rotatable member, and means for holding said reinforcing elements upon the rotatable member until in position to be deposited upon the material.

26. A machine of the character described including means for feeding a strip of material, a rotatable member for delivering reinforcing elements to the material, means for depositing the reinforcing elements upon the rotatable member, and means extending partially around the periphery of the rotatable member for holding the reinforcing elements thereon until in position to be deposited on the material.

27. A machine of the character described including means for feeding a strip of material, a rotatable member for depositing reinforcing elements upon the material, means for delivering the reinforcing elements to the rotatable member, and arcuate shaped members cooperating with the rotatable member for holding the reinforcing elements thereon until in a position to be deposited upon the material.

28. A machine of the character described including means for feeding a strip of material, a rotatable member, means for positioning reinforcing elements on opposite faces of the material, means for displacing portions of the reinforcing element on one face of the material, and means carried by the rotatable member for engaging the displaced portions with the reinforcing element on the opposite faces of the material.

29. A machine of the character described including means for feeding a strip of material, a rotatable member, means for positioning reinforcing elements on opposite faces of the material, means for displacing portions of the reinforcing element on one face of the material, and a slidable member carried by the rotatable member for engaging the displaced portions with the reinforcing element on the opposite faces of the material.

30. A machine of the character described including means for feeding a strip of material, a rotatable member, means for positioning reinforcing elements on opposite faces of the material, means for displacing portions of the reinforcing element on one face of the material, and circumferentially spaced members carried by the rotatable member and adapted to be engaged with the offset portions of the reinforcing member on one face of the material to engage the same with the reinforcing element on the opposite face of the material.

31. A machine of the character described including means for feeding a strip of material, a rotatable member, means for positioning reinforcing elements on opposite faces of the material, means for displacing portions of the reinforcing element on one face of the material, circumferentially spaced members carried by the rotatable member and adapted to be engaged with the displaced portions of the reinforcing member on one face of the material with the reinforcing member on the opposite face of the material, and means for successively operating the circumferentially spaced members.

32. A machine of the character described including means for feeding a strip of material, means for corrugating the strip of material, said corrugating means including a rotatable member, means for depositing a transversely extending reinforcing element on the rotatable member from which it will be delivered into a corrugation of the material, means for positioning longitudinally extending reinforcing elements relative to opposite faces of the material, the longitudinally extending reinforcing elements on one face of the material engaging the transversely extending reinforcing elements, means for displacing portions of the longitudinally extending reinforcing element on one face of the material, and means for engaging said displaced portions with the longitudinally extending reinforcing element on the opposite face of the material.

33. A machine of the character described including means for feeding a strip of material, means for corrugating the strip of material, said corrugating means including a rotatable member, means for depositing a transversely extending reinforcing element on the rotatable member from which it will be delivered into a corrugation of the material, means for positioning longitudinally extending reinforcing elements relative to opposite faces of the material, the longitudinally extending reinforcing elements on one face of the material engaging the transversely extending reinforcing elements, means for displacing portions of the longitudinally extending reinforcing element on one face of the material, and means carried by the rotatable member and adapted to be engaged with the displaced portions of the longitudinally extending reinforcing element on one face of the material to engage the same with the longitudinally extending reinforcing element on the opposite face of the material.

34. A machine of the character described including means for feeding a strip of material, means for corrugating the strip of material, said corrugating means including a rotatable member, means for depositing a transversely extending reinforcing element on the rotatable member from which it will be delivered into a corrugation of the material, means for positioning longitudinally extending reinforcing elements relative to opposite faces of the material, the longitudinally extending reinforcing elements on one face of the material engaging the transversely extending reinforcing elements, means for displacing portions of the longitudinally extending reinforcing element on one face of the material, and slidable members carried by the rotatable member and adapted to be engaged with the displaced portions of the longitudinally extending reinforcing element on one face of the material to engage the same with the longitudinally extending reinforcing element on the opposite face of the material.

35. A machine of the character described including means for feeding a strip of material, means for corrugating the material, said corrugating means including a rotatable member, means for depositing transversely extending reinforcing elements upon the rotatable member which in turn delivers the same into corrugations of the material, means for positioning longitudinally extending reinforcing elements relative to opposite faces of the material, the longitudinally extending reinforcing elements on one face of the material engaging the transversely extending reinforcing elements, means for displacing portions of the reinforcing element on one face of the material and passing the same through the material, circumferentially spaced members carried by the rotatable member and adapted to be engaged with the displaced portions of the longitudinally extending reinforcing element on one face of the material for engaging the same with the longitudinally extending reinforcing element on the opposite face of the material, and means for successively operating the circumferentially spaced members carried by the rotatable member.

36. A machine of the character described including means for feeding a strip of material, a magazine adapted to receive a lath, and means for transferring the lath from the magazine to the strip of material.

37. A machine of the character described including means for feeding a strip of material, a magazine adapted to receive a lath, and a rotatable member for transferring the lath from the magazine to the material.

38. A machine of the character described including means for feeding a strip of material, a magazine for receiving a lath, means for transferring the lath from the magazine to the material, and means for delivering the lath from the magazine to the transferring means.

39. A machine of the character described including means for feeding a strip of material, a rotatable member having a recess therein, a magazine adapted to receive a lath, and means for delivering the lath from the magazine to the recess in the rotatable member, the rotatable member in turn delivering the lath to the material.

40. A machine of the character described including means for feeding a strip of material, a magazine for receiving a lath, and a rotatable member for corrugating the material and transferring the lath from the magazine to the material.

41. A machine of the character described including means for feeding a strip of material, a magazine adapted to receive a lath, and a rotatable member for corrugating the material and transferring the lath from the magazine to the material, said rotatable member having a recess into which the lath is delivered from the magazine.

42. A machine of the character described including means for feeding a strip of material, a magazine for containing a lath, a rotatable member for transferring the lath from the magazine to the material, and means for ejecting the lath from the magazine onto the rotatable member.

43. A machine of the character described including means for feeding a strip of material, a magazine adapted to receive a lath, a rotatable member for transferring the lath from the magazine to the material, and a plunger for ejecting the lath from the magazine and depositing the same upon the rotatable member.

44. A machine of the character described including means for feeding a strip of material, a magazine having a hinged bottom adapted to support a lath, means for transferring the lath from the magazine to the material, and means for displacing the hinged bottom to deliver the lath to the transferring means.

45. A machine of the character described including means for feeding a strip of material, a magazine having a spring controlled hinged bottom adapted to support a lath, means for transferring the lath from the magazine to the material, and means for displacing the spring controlled hinged bottom to deliver the lath to the transferring means.

46. A machine of the character described including means for feeding a strip of material, a magazine having a hinged bottom adapted to support a lath, means for transferring the lath from the magazine to the material, and means engageable with the lath for discharging the same from the magazine into position on the transferring means.

47. A machine of the character described including means for feeding a strip of material, a magazine having a hinged bottom adapted to normally support a lath, means for transferring the lath from the magazine to the material, and a plunger operable relative to the magazine and adapted to engage the lath for ejecting the same from the magazine and positioning the same upon the transferring means.

48. A machine of the character described including means for feeding a strip of material, a magazine having a hinged bottom adapted to normally support a lath or the like, a rotatable member adapted for transferring the lath from the magazine to the material, said rotatable member having a recess therein, and means engageable with the lath for ejecting the same from the magazine and depositing it into the recess of the rotatable member.

49. A machine of the character described including means for feeding a strip of material, a magazine adapted to receive a lath, means for positioning the lath in the magazine, and means for transferring the lath from the magazine to the material.

50. A machine of the character described including means for feeding a strip of material, a magazine adapted to received a lath, means for feeding the lath to the magazine, means engageable with the end of the lath for limiting the feeding movement thereof, and means for transferring the lath from the magazine to the material.

51. A machine of the character described including means for feeding a strip of material, a magazine adapted to receive a lath, means for feeding the lath to the magazine, a pivoted member engageable with the lath for limiting the feeding movement thereof and means for transferring the lath from the magazine to the material.

52. A machine of the character described including means for feeding a strip of material, a magazine adapted to receive a lath, means for feeding the lath to the magazine, means engageable with the lath to limit the feeding movement thereof, means for releasing said limiting means, and means for transferring the lath from the magazine to the material.

53. A machine of the character described including means for feeding a strip of material, a magazine adapted to receive a lath, means for feeding the lath to the magazine, a pivoted member adapted to engage the end of the lath for limiting the feeding movement thereof, means for releasing said pivoted member, and means for transferring the lath from the magazine to the material.

54. A machine of the character described including means for feeding a strip of material, a magazine adapted to receive a lath, means for feeding the lath to the magazine, a pivoted member adapted to engage the end of the lath to limit the feeding movement thereof, means for transferring the lath from the magazine to the material, means for ejecting the lath from the magazine and onto the transferring means, and means for releasing the pivoted member from engagement with the lath during the ejecting operation.

55. A machine of the character described including means for feeding a strip of material, means for positioning laths relative to the material, means for connecting the laths to the material, and means for severing the material with the laths attached, into the desired lengths, said severing means including a reciprocable cutting member and means for operating the same, the operating means including a rotatable shaft, a gear freely rotatable relative to the shaft, means for constantly rotating the gear, and means connected to the shaft and adapted to be engaged by the rotatable gear for rotating the shaft.

56. A machine of the character described including means for feeding a strip of material, means for positioning laths relative to the material, means for connecting the laths to the material, and means for severing the material with the laths attached into the desired lengths, said severing means including a reciprocable cutting member and means for operating the same, the operating means including a rotatable shaft, a gear freely rotatable relative to the shaft, means for constantly driving the gear, a member connected to the shaft, and means carried by said last mentioned member adapted to be positioned to be engaged by the gear to rotate the shaft, but normally positioned out of the path of the gear.

57. A machine of the character described including means for feeding a strip of material, means for positioning laths relative to the material, means for connecting laths to the material, and means for severing the material into the desired lengths, said severing means including a reciprocable member and means for operating the same, said operating means including a rotatable shaft, a gear freely rotatable relative to the shaft, means for constantly driving the gear, a member connected to the shaft, a slidable pin carried by said member and normally positioned out of the path of the gear, and means for releasing said pin whereby it will be positioned in the path of the gear to be engaged thereby to rotate the shaft.

58. A machine of the character described including means for feeding a strip of material, means for positioning laths relative to the material, means for connecting the laths to the material, and means for severing the material into the desired lengths, said severing means including a reciprocable member and means for operating the same, said operating means including a rotatable shaft, a gear freely rotatable relative to the shaft, means for constantly driving the gear, a member connected to the shaft, a slidable pin carried by said member and normally positioned out of the path of the gear, means for releasing said pin whereby it will be positioned in the path of the gear to be engaged thereby to rotate the shaft, and means for returning the pin to its normal position.

59. A machine of the character described including means for feeding a strip of material, means for positioning laths relative to the material, means for connecting the laths to the material, means for severing the material into the desired lengths, said severing means including a reciprocable member and means for operating the same, said operating means including a rotatable shaft, a gear freely rotatable relative to the shaft, means for constantly driving the gear, a member connected to the shaft, a slidable pin carried by said member and normally positioned out of the path of the gear, a slidable bolt adapted for normally holding the pin out of the path of the gear, and means for operating the slidable bolt to release the pin to be positioned in the path of the gear and to be engaged thereby for rotating the shaft.

60. A machine of the character described including means for feeding a strip of material, means for positioning laths relative to the material, means for connecting laths to the material, means for severing the material into the desired lengths, said severing means including a reciprocable member and means for operating the same, said operating means including a rotatable shaft, a gear freely rotatable relative to the shaft, means for constantly driving the gear, a member connected to the shaft, a slidable pin carried by said member and normally positioned out of the path of the gear, a slidable bolt adapted for normally holding the pin out of the path of the gear, and means for operating the slidable bolt to release the pin to be positioned in the path of the gear and to be engaged thereby for rotating the shaft, said slidable bolt having a beveled surface adapted to be engaged by the pin for returning the same to its normal position.

61. A machine of the character described including means for feeding a strip of material and connecting laths thereto, means for severing the material into the desired lengths, means for conveying the material from the severing means, means for winding the material into roll form, and a pivoted platform for positioning the material relative to the winding means.

62. A machine of the character described including means for feeding a strip of material and connecting laths thereto, means for severing the material into the desired lengths, means for conveying the material from the severing means, means for winding the material into roll form, a pivoted platform for positioning the material relative to the winding means, and means for holding the platform in raised position.

63. A machine of the character described including means for feeding a strip of material and connecting laths thereto, means for conveying the material after the laths have been connected, and means for winding the material into roll form, said winding means including a rotatable sleeve and means for connecting the material thereto.

64. A machine of the character described including means for feeding a strip of material and connecting laths thereto, means for conveying the material after the laths have been connected, means for winding the material into roll form, said winding means including a rotatable sleeve, and a member rotatable relative thereto for connecting the material with the sleeve.

65. A machine of the character described including means for feeding a strip of material and means for connecting laths thereto, means for conveying the material after the laths have been connected thereto, and means for winding the material into roll form, said winding means including a rotatable sleeve having an opening therein through which the end of the material passes and a member rotatable in said sleeve for connecting the material thereto.

66. A machine of the character described including means for feeding a strip of material, means for connecting laths to the material, means for conveying the material with the laths attached, and means for winding the material into roll form, said winding means including a rotatable sleeve having an opening therein through which the end of the material extends, a member within the sleeve and rotatable relative thereto for connecting the end of the material to the sleeve, and means for driving the member within the sleeve.

67. A machine of the character described including means for feeding a strip of material, means for connecting laths to the material, means for conveying the material with the laths attached, means for winding the material into roll form, said winding means including a sleeve having an opening therein through which the end of the material passes, a member rotatable in the sleeve for connecting the material thereto, and means for guiding the end of the material into the opening of the sleeve.

68. A machine of the character described including means for feeding a strip of material, means for connecting laths to the material, and means for severing the material into the desired lengths, said severing means including a reciprocable cutter and means for operating the same, the operating means including a rotatable shaft, a gear freely rotatable on the shaft, means for constantly driving the gear, a member connected to the shaft, a slidable pin carried by the member, a slidable bolt normally holding the pin out of the path of the gear, and means for releasing the bolt to allow the pin to be projected into the path of the gear, said bolt releasing means including a ratchet wheel having one notch deeper than the other, a lever having a pawl pivotally connected thereto and adapted to be engaged with the ratchet wheel, and means adapted to be engaged by the pawl when in the deepest notch to operate the bolt releasing means.

69. A machine of the character described including means for feeding a strip of material, means for corrugating the strip of material, means for forming laths and positioning the same in corrugations of the material, means for connecting the laths to the material, and means for cutting the material with the laths attached into the desired lengths.

70. A machine of the character described including means for feeding a strip of material, means for corrugating the material, means for forming laths and positioning the same in corrugations of the material, means for connecting the laths to the material, means for cutting the material into the desired lengths, means for conveying the material from the cutting means, and means for winding the material into roll form.

71. A machine of the character described including means for feeding a strip of material, means for corrugating the material, means for forming laths and positioning the same in corrugations of the material, means for positioning wires longitudinally relative to opposite faces of the material, the wires on one face of the material engaging the laths, means for displacing portions of the wires on one face of the material and passing the same through the material, means for engaging the displaced portions with the wires on the opposite face of the material, and means for cutting the material and longitudinally extending wires into the desired lengths.

72. A machine of the character described including means for feeding a strip of material, means for corrugating the material, means for forming laths and positioning the same in corrugations of the material, means for positioning wires longitudinally relative to opposite faces of the material, the wires on one face of the material engaging the laths, means for displacing portions of the wires on one face of the material and passing the same through the material, means for engaging the displaced portions with the wires on the opposite face of the material, and means for conveying the material from the cutting means.

73. A machine of the character described including means for feeding a strip of material, means for corrugating the material, means for forming laths and positioning the same in corrugations of the material, means for positioning wires longitudinally relative to opposite faces of the material, the wires on one face of the material engaging the laths, means for displacing portions of the wires on one face of the material and passing the same through the material, means for engaging the displaced portions with the wires on the opposite face of the material, means for cutting the material and longitudinally extending wires into the desired lengths, means for conveying the material from the cutting means, and means for winding the material into roll form.

74. A machine of the character described including means for feeding a strip of material such as paper, means for corrugating the paper strip, means for feeding a strip of material such as metal, means for forming laths from said metal strip, means for positioning the laths in corrugations of the material and transversely thereof, means for positioning strips of wire relative to opposite faces of the material and longitudinally thereof, the wires of one face of the material extending over the laths in the corrugations, means for displacing portions of the wire strips on one face of the material and passing the same through the material, means for engaging the displaced portions with the wire strips on the opposite face of the material, and means for cutting the material and wire strips into the desired lengths.

75. A machine of the character described including means for feeding a strip of material such as paper, means for corrugating the paper strip, means for feeding a strip of material such as metal, means for forming laths from said metal strip, means for positioning the laths in corrugations of the material and transversely thereof, means for positioning strips of wire relative to opposite faces of the material and longitudinally thereof, the wires on one face of the material extending over the laths in the corrugations, means for displacing portions of the wire strips on one face of the material and passing the same through the material, means for engaging the displaced portions with the wire strips on the opposite face of the material, means for cutting the material and wire strips into the desired lengths, and means for conveying the material from the cutting means.

76. A machine of the character described including means for feeding a strip of material such as paper, means for corrugating the paper strip, means for feeding a strip of material such as metal, means for forming laths from said metal strip, means for positioning the laths in corrugations of the material and transversely thereof, means for positioning strips of wire relative to opposite faces of the material and longitudinally thereof, the wires on one face of the material extending over the laths in the corrugations, means for displacing portions of the wire strips on one face of the material and passing the same through the material, means for engaging the displaced portions with the wire strips on the opposite face of the material, means for cutting the material and wire strips into the desired lengths, means for conveying the material from the cutting means, and means for winding the material with the parts connected thereto into roll form.

In testimony whereof I hereunto affix my signature.

EDWARD S. HALL.